United States Patent Office 3,442,918
Patented May 6, 1969

3,442,918
17α-ALKA-1',3'-DIYNYL STEROIDS
Peter Feather and Vladimir Petrow, London, England, assignors to The British Drug Houses Limited
No Drawing. Filed Sept. 2, 1966, Ser. No. 576,866
Claims priority, application Great Britain, Sept. 14, 1965, 39,276/65; Nov. 5, 1965, 47,078/65
Int. Cl. C07c 169/10, 199/08
U.S. Cl. 260—397.4  22 Claims

ABSTRACT OF THE DISCLOSURE

A group of new 17α-alka-1',3'-diynyl 17β-hydroxy- and 17β-alkoxy steroid compounds have been prepared. These compounds are of value in the treatment of certain conditions and defects of the reproductive system and for their effects upon fertility. They may be prepared by reacting the corresponding 17-oxo steroid with a metallic derivative of an alka-1,3-diyne and subsequently regenerating the desired derivative from the complex so formed.

---

This invention is for improvements in or relating to organic compounds and has particular reference to steroidal 17α-alka-1',3'-diynyl-17β-hydroxy(17β-alkoxy) - derivatives and to a process for their preparation. In our copending application Ser. No. 559,737, filed June 23, 1966 is described a process for the preparation of the hitherto unreported 17α-alka-1',3'-diynyl-17β - hydroxy(alkoxy)- steroids, which process comprises the direct alkylation of the corresponding butadiynyl steroids. Such compounds are of value in the art on account of their valuable biological properties. Thus they may possess hormonal and antihormonal properties including oestrogenic, progestational, claudogenic, ovulation-inhibiting and gonadotrophin-inhibiting properties, which render the compounds of value in preparations for the treatment of a wide range of conditions and defects of the reproductive system and for the limitation or enhancement of fertility. In addition, the 18-methyl- and 18-ethyl-oestra-1,3,5(10)-triene derivatives have favourable lipotrophic/oestrogenic ratios. The compounds of the present invention may be administered in the form of tablets, pills, injections, vaginal tampons and other standard pharmaceutical preparations.

It is an object of the present invention to provide certain new 17α-alka-1',3'-diynyl-17β-hydroxy- and 17α-alka-1',3'-diynyl-17β-alkoxy-steroids having the partial formula

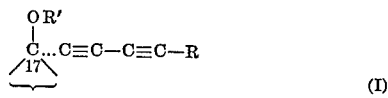

(I)

where R is an alkyl group containing up to 5 carbon atoms and R' is H or R.

It is another object of the present invention to provide an improved process for the preparation of the foregoing 17α-alka-1',3'-diynyl-17β-hydroxy- and 17α-alka-1',3'-diynyl-17β-alkoxy-steroids from the corresponding 17-oxo-steroids having the partial formula

(II)

According to the present invention there is provided an improved process for the preparation of 17α-alka-1',3'-diynyl-17β-hydroxy steroids, which process comprises reacting the corresponding 17-oxo-steroid with a metallic derivative of an alka-1,3-diyne including the lithium, sodium, potassium or magnesium (mono-Grignard derivatives) and subsequently regenerating the desired derivative from the complex so formed. Such metallic derivatives are known in the art.

Monosodio-alka-1,3-diynes are the preferred reagents and may be conveniently prepared by treating the appropriate 1,4-dichloro-alk-2-yne (see for example C. L. Cook, E. R. H. Jones and M. C. Whiting, J. Chem. Co., 1952, 2883) in a refluxing solution of liquid ammonia with three molecular proportions of sodamide, with exclusion of moisture.

Alternatively, the required monosodio-alka-1,3-diyne may be prepared by alkylating butadiyne prepared in situ and converting it into the monosodium derivative. This is conveniently effected by adding 1,4-dichloro-but-2-yne to three molecular proportions of sodamide in stirred liquid ammonia, followed after approximately 5 minutes by ca one molecular proportion of the appropriate alkyl iodide and after approximately three hours by ca one molecular proportion of sodamide, which may conveniently be in liquid ammonia.

Alternatively, the monosodio-alkadiyne may be prepared by adding the free alkadiyne to sodamide in liquid ammonia. Amides of lithium or potassium may be employed in liquid ammonia in place of sodamide. A suitable magnesium alkadiyne derivative may be prepared, for example, by adding the alkadiyne to magnesium ethyl bromide in a suitable solvent such as ether or tetrahydrofuran.

Somewhat less than one molecular proportion of the 17-oxo-steroidal material may be conveniently employed and, if desired, may be added in an anhydrous nonhydroxylic organic solvent such as ether or tetrahydrofuran to the prepared solution or suspension of the metal-alkadiyne derivative in situ. After addition is complete, the mixture may be stirred under reflux, for example for one or more hours, and ammonium chloride or other suitable reagent may then be added to liberate the desired product from its metal derivative. Ammonia when present, may be allowed to evaporate and the mixture may be worked-up by methods usual in the art. The crude product may be purified by chromatography and/or crystallisation from a suitable solvent as desired.

This novel process constitutes an improvement over our copending application Ser. No. 559,737, filed June 23, 1966 in that the 17α-alka-1',3'-diynyl-17β-hydroxy-steroids are obtained directly from the 17-oxo-steroidal starting materials in a single stage and in improved yield.

As will be apparent to those skilled in the art, 17α-alka-1',3'-diynyl-17β-hydroxy-steroids may be converted into the corresponding 17β-alkoxy steroids by, for example, a process similar to that described in Belgian Patent No. 636,603, in which the 17α-alka-1',3'-diynyl-17β-hydroxy-steroid in a suitable anhydrous nonhydroxylic organic solvent such as tetrahydrofuran is added to sodamide in liquid ammonia at approximately −60° C. followed, for example, after 10 minutes to 2 hours, by the appropriate alkyl halide, preferably an iodide. The mixture is stirred for 1 hour or longer and worked-up in the usual manner. The 17α-alka-1',3'-diynyl-17β-alkoxy-steroid formed may be purified by chromatography and/or crystallisation from a suitable solvent.

It will be apparent to those skilled in the art that the process of the invention may be applied to steroids containing a wide variety of substituents and unsaturated linkages in Rings A, B, C and D. It will in certain cases be necessary, when so desired, to prevent other groups present in the steroid molecule from simultaneously undergoing reaction or interfering with the process of the invention.

Carbonyl groups, and in particular carbonyl groups at $C_1$, $C_2$, $C_3$, $C_4$, $C_6$ and $C_{12}$, will require protection which may be achieved, for example, by preliminary conversion into a ketal, thioketal, enamine or enol ether, and subsequent regeneration.

Hydroxy groups, and in particular hydroxy groups at $C_1$, $C_2$, $C_3$, $C_4$, $C_5$, $C_6$, $C_7$ and $C_{11}$, do not interfere with the process of the invention, but may sometimes be advantageously protected by prior conversion into the tetrahydropyranyl ether and subsequent regeneration.

Alkoxy groups, including diaminoalkoxy groups, at $C_3$, $C_6$ and $C_7$, do not interfere with the process of the invention.

Alkyl and alkenyl groups containing up to 3 carbon atoms, and, in particular, methyl or methylene groups at $C_1$, $C_2$, $C_3$, $C_4$, $C_6$, $C_7$ and $C_{16}$, will not, in general, interfere with the process of the invention.

Unsaturated linkages, and in particular such linkages at $C_1$, $C_2$, $C_3$, $C_4$, $C_5$, $C_{5(10)}$, $C_6$, $C_7$, $C_8$, $C_{8(14)}$, $C_9$, $C_{9(11)}$, $C_{11}$ and $C_{14}$ and combinations of such unsaturated linkages including aromatic Rings A and/or B will not, in general, interfere with the process of the invention.

New 17α-alka-1′,3′-diynyl steroids provided by the present invention may belong to the androstane, 19-norandrostane, oestrane, 18-methyloestrane, 18-ethyl-oestrane, oestratriene, 18-methyl-oestratriene or 18-ethyl-oestratriene series and may optionally contain:

Unsaturated linkages at Δ1, Δ2, Δ3, Δ4, Δ5, Δ5(10), Δ6, Δ7, Δ8, Δ9, Δ9(11), Δ11, or Δ14, or combinations of two or more such unsaturated linkages including aromatic rings A and/or B; hydroxy groups at $C_1$, $C_3$, $C_4$, $C_5$, $C_6$, $C_{11}$, or $C_{17}$, or derived acyloxy groups containing not more than 5 carbon atoms, or combinations of two or more such groups; 3-dialkylaminoalkoxy groups in which the alkyl groups may contain up to 5 carbon atoms; alkoxy groups containing not more than 5 carbon atoms at $C_3$ or $C_{17}$; alkyl or alkenyl groups containing up to 3 carbon atoms, at $C_1$, $C_2$, $C_4$, $C_6$, $C_7$ or $C_{16}$, or combinations of two or more such groups; carbonyl groups at $C_2$, $C_3$, $C_6$, $C_{11}$ or $C_{12}$, or combinations of two or more such groups.

The new 17α-alka-1′,3′-diynyl steroids of the present invention may have one of the following formulae:

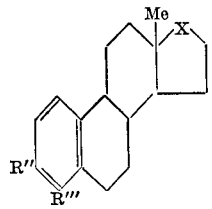

where R″=H, OH, or OR^IV and R‴=H or Me (where R^IV =alkyl containing not more than 12 carbon atoms)

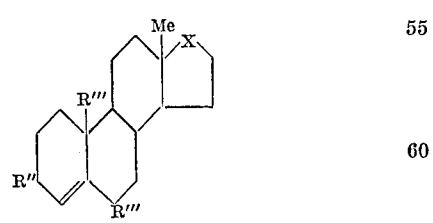

where R″=H₂ or :O, and R‴=H or Me

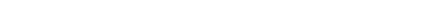

where R″=alkyl group containing up to 5 carbon atoms

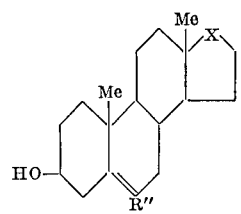

where R″=H or Me

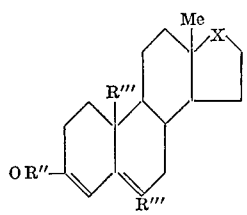

where R″=Me or Et, and R‴=H or Me

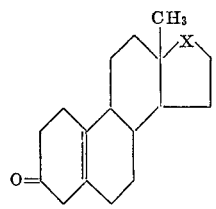

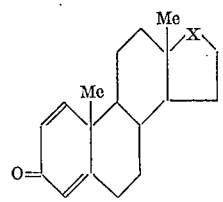

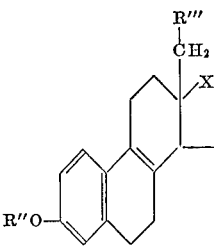

where R‴=Me or Et and R″=H or an alkyl group containing not more than 12 carbon atoms

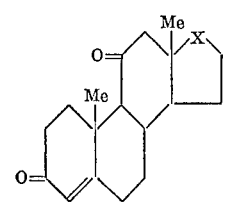

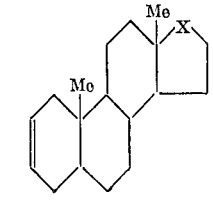

where R'''=Me or Et

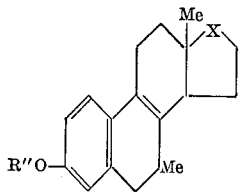

where R''=H or an alkyl group containing not more than 12 carbon atoms

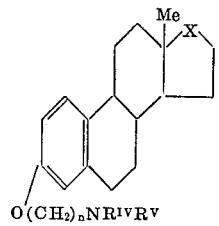

O(CH₂)ₙNR^IV R^V where n is an integer between 2 and 6 and R^IV and R^V are alkyl groups containing up to 5 carbon atoms

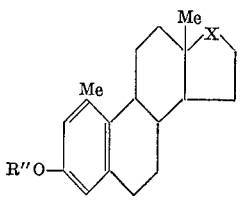

where R''=H or an alkyl group containing not more than 12 carbon atoms

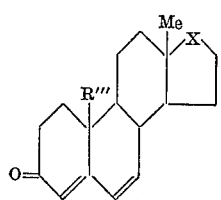

where R''' is H or Me and

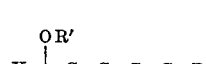

$$X=\overset{OR'}{|}-C\equiv C-C\equiv C-R$$

where R is an alkyl group containing up to 5 carbon atoms and R' is H or R

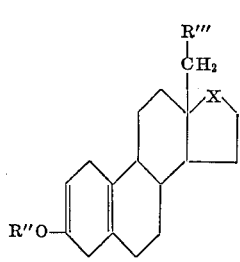

where R''=an alkyl group containing not more than 5 carbon atoms where R'''=Me or Et and

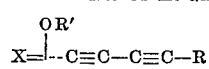

$$X=\overset{OR'}{|}-C\equiv C-C\equiv C-R$$

where R is an alkyl group containing up to 5 carbon atoms and R' is H or R

Some of the products of the present invention, when crystallised from organic solvents, may be obtained as crystals containing solvent of crystallisation. When desired, such solvent of crystallisation may be largely removed by standard techniques, such as heating the solvated crystals at elevated temperatures and reduced pressures, or by sublimation in vacuo.

Following is a description by way of example of methods of carrying the invention into effect.

EXAMPLE 1

17α-penta-1',3'-diynyl-3-methoxy-oestra-1,3,5(10)-trien-17β-ol

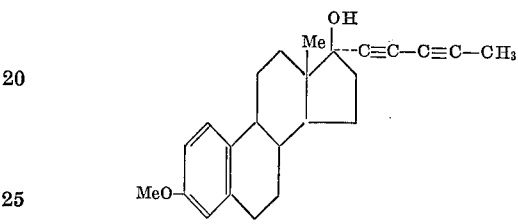

1,4-dichlorobut-2-yne (12.3 g.) was added dropwise with stirring to sodamide (from 7.0 g. of sodium and a trace of ferric nitrate) in refluxing liquid ammonia (250 ml.), followed, after 5 minutes, by methyl iodide (15.5 g.). The mixture was stirred under reflux for 3 hours, cooled to —70° C., and sodamide (from 2.3 g. of sodium and a trace of ferric nitrate) in liquid ammonia (150 ml.) was added. The mixture was stirred for 30 minutes while warming to reflux temperature, oestrone 3-methyl ether (10.0 g.) in anhydrous tetrahydrofuran (300 ml.) was added, and the mixture was stirred under reflux for 1½ hours. Solid ammonium chloride was added, the ammonia was allowed to evaporate, and the residue was extracted with ether. The ethereal solution was evaporated at reduced pressure and the steroidal product was purified by chromatography of alumina, eluting with mixture of petroleum ether and toluene, affording 17α-penta-1',3'-diynyl - 3 - methoxy - oestra - 1,3,5(10) - trien - 17β-ol, $[\alpha]_D^{29}$ —50° (c., 0.998 in dioxan);

$\lambda_{max.}^{EtOH}$ 279 mμ (ε, 2030), 287 mμ, (ε, 1940); $\nu_{max.}^{CCl_4}$ 3607, 2240, 1609, 1592 cm.⁻¹; $\nu_{max.}^{CS_2}$ 1253, 1043 cm.⁻¹, M.P. 131.5° C.

17α-penta-1',3'-diynyl-3,17β-dimethoxy-oestra-1,3,5(10)-triene

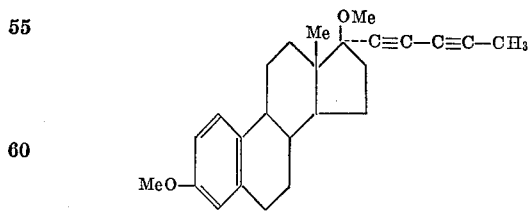

17α - penta - 1',3' - diynyl - 3 - methoxy - oestra - 1,3,5(10)-trien-17β-ol (3.4 g.) in anhydrous tetrahydrofuran (100 ml.) was added dropwise to stirred sodamide (from 0.46 g. of sodium and a trace of ferric nitrate) in liquid ammonia (150 ml.) at ca —70° C., and the mixture was stirred for 30 minutes. Methyl iodide (3.0 g.) in tetrahydrofuran (10 ml.) was added and the mixture was stirred at ca —60° C. for 3 hours and poured onto ice. The steroidal product was extracted with ether and purified by chromatography on alumina, eluting with toluene, and by crystallisation from methanol, affording 17α-penta-1',3' - diynyl - 3,17β- dimethoxy - oestra - 1,3,5(10) - triene as colourless needles, M.P. 117.5° C., $[\alpha]_D^{24}$ —62° (c., 0.25 in dioxan);

$\lambda_{max.}^{EtOH}$ 278 m$\mu$ ($\epsilon$, 2040); $\lambda_{max.}^{EtOH}$ 286 m$\mu$ ($\epsilon$, 1910); $\nu_{max.}^{Nujo}$ 2283 cm.$^{-1}$

EXAMPLE 2

17α-penta-1',1'-diynyl-3-methoxy-osetra-2,5(10)-dien-17β-ol

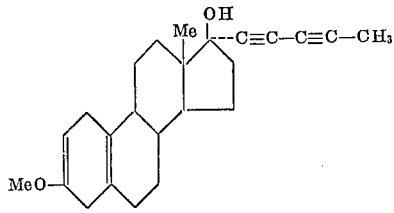

1,4-dichlorobut-2-yne (12.3 g.) was added dropwise with stirring to sodamide (from 7.2 g. of sodium and a trace of ferric nitrate) in refluxing liquid ammonia (250 ml.), followed, after 10 minutes, by methyl iodide (16.5 g.). The mixture was stirred under reflux for 3 hours, cooled to —70° C., and sodamide (from 2.3 g. of sodium and a trace of ferric nitrate) in liquid ammonia 150 ml.) was added. The mixture was stirred for 10 minutes while warming to reflux temperature, 3-methoxy-oestra-2,5(10)-dien-17-one (10.0 g.) in anhydrous tetrahydrofuran (200 ml.) was added, and the mixture was stirred under reflux for 1½ hours. Solid ammonium chloride was added, the ammonia was allowed to evaporate, and the residue was extracted with ether. The ethereal solution was evaporated at reduced pressure and the steroidal product was purified by chromatography on neutral alumina, eluting with toluene, affording 17α-penta-1',3'-diynyl-3-methoxy-oestra-2,5(10)-dien-17β-ol, $\nu_{max.}^{CCl_4}$ 3602, 2254, 1696, 1665 cm.$^{-1}$ 17α-penta-1',3'-diynyl-19-norandrost-4-en-17β-ol-3-one

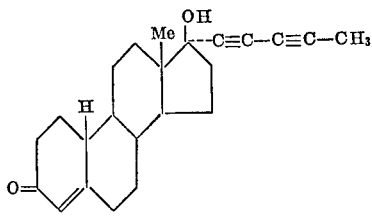

17α - penta-1,3' - diynyl - 3 methoxy - oestra - 2,5(10)-dien-17β-ol (3.97 g.) in methanol (150 ml.) was treated at 60° C., for 15 minutes with 3 N aqueous hydrochloric acid (75 ml.). The solution was cooled and poured into ice-water and the resulting precipitate was collected, washed with water, dried, and purified by chromatography on alumina, eluting with toluene, and by crystallisation from ether, affording 17α-penta-1',3'-diynyl-19-norandrost-4-en-17β-ol-3-one as colourless needles, M.P. 117.5° C., $[\alpha]_D^{27}$ —94° (c., 1.28 in dioxan);

$\lambda_{max.}^{EtOH}$ 239 m$\mu$ ($\epsilon$, 16,150); $\nu_{max.}^{CCl_4}$ 3609, 2242, 1677, 1622 cm.$^{-1}$ 17α-penta-1',3'-diynyl-3,17β-dimethoxy-oestra-2,5(10)-diene

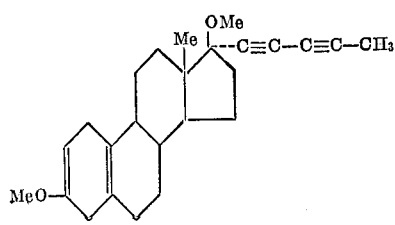

17α - penta - 1',3' - diynyl - 3 - methoxy - oestra - 2,5(10)-dien-17β-ol (12.5 g.) in anhydrous tetrahydrofuran (130 ml.) was added dropwise to vigorously stirred sodamide (from 2.5 g. of sodium and a trace of ferric nitrate) in liquid ammonia (300 ml.) at —70° C., followed, after 30 minutes, by methyl iodide (20 g.) in tetrahydrofuran (45 ml.), and the mixture was stirred for 2 hours while gradually warming to reflux temperature. The mixture was poured onto ice and the steroidal product was recovered by ether extraction affording amorphous 17α-penta-1',3'-diynyl-3,17β-dimethoxy-oestra-2,5(10)-diene, $\nu_{max.}^{CCl_4}$ 2240, 1697, 1667 cm.$^{-1}$, $\nu_{max.}^{CS_2}$ 1220, 1096 cm.$^{-1}$ 17α-penta-1',3'-diynyl-17β-methoxy-19-norandrost-4-en-3-one

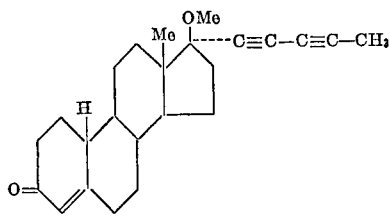

17α - penta - 1',3' - diynyl - 3,17β - dimethoxy - oestra-2,5(10)-diene (9.3 g.) in methanol (700 ml.) was treated at 60° C. for 15 minutes with 3 N aqueous hydrochloric acid (175 ml.). The solution was cooled and poured into ice-water and the resulting precipitate was extracted with ether, recovered by evaporation of the ether and purified by chromatography on alumina, eluting with toluene and by crystallisation from aqueous acetone, affording 17α - penta - 1',3' - diynyl - 17β - methoxy - 19 - norandrost-4-en-3-one.

$\nu_{max.}^{CCl_4}$ 2243, 1678, 1620 cm.$^{-1}$

17α-penta-1',3'-diynyl-oestra-5(10)en-17β-ol-3-one

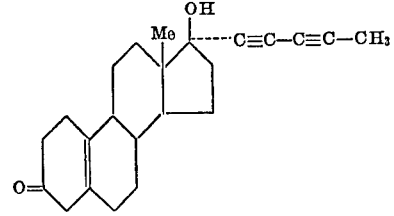

A solution of anhydrous oxalic acid (0.9 g.) in water (18 ml.) was added to 17α-penta-1',3'-diynyl-3-methoxy-oestra-2,5(10)-dien-17β-ol (1.2 g.) in methanol (180 ml.) and the mixture was stirred at room temperature for 1 hour. Ether (400 ml.) was added, the mixture was shaken with aqueous sodium bicarbonate solution and then with water, dried and stripped under reduced pressure. Purification by chromatography on neutral alumina, eluting with toluene, afforded 17α-penta-1',3'-diynyl-oestra-5(10)-en-17β-ol-3-one.

$\nu_{max.}^{CCl_4}$ 3600, 2245, 1722 cm.$^{-1}$

EXAMPLE 3

17α-hexa-1',3'-diynyl-3-methoxy-oestra-1,3,5(10)-trien-17β-ol

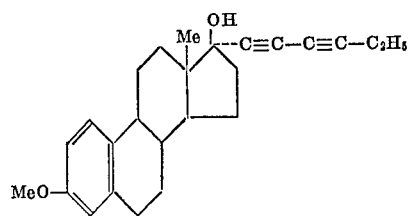

Hexadiyne (5.3 g.) (J. B. Armitage, E. R. H. Jones and M. C. Whiting, J. Chem. Soc., 1952, 1933) was added to sodamide (from 1.6 g. of sodium and a trace of ferric nitrate) in stirred refluxing liquid ammonia (200 ml.), followed, after 5 minutes, by oestrone 3-methyl ether (11.0 g.) in anhydrous tetrahydrofuran (300 ml.), and the mixture was stirred, under reflux, for 2 hours. Solid ammonium chloride (4.0 g.) was added and the ammonia was allowed to evaporate. The steroidal product was recovered by extraction with ether and purified by chromatography on an alumina column, eluting with toluene/ether mixtures, and by crystallisation from hexane affording 17α - hexa-1′,3′-diynyl-3-methoxy-oestra-1,3,5(10)-trien-17β-ol, $[\alpha]_D^{30}$ —50° (c., 1.32 in dioxan);

$\lambda_{max.}^{EtOH}$ 278 mμ (ε, 2070); $\lambda_{max.}^{EtOH}$ 287 mμ (ε, 1960); $\lambda_{inf}^{EtOH}$ 219 mμ (ε, 10,000); $\lambda_{inf}^{EtOH}$ 258 mμ (ε, 634); $\nu_{max.}^{CCl_4}$ 3600, 2240, 1609, 1497 cm.$^{-1}$; $\nu_{max.}^{CS_2}$ 1256, 1238, 1042 cm.$^{-1}$, M.P. 66–69° C.

17α-hexa-1′,3′-diynyl-3,17β-dimethoxy-oestra-1,3,5(10)-triene

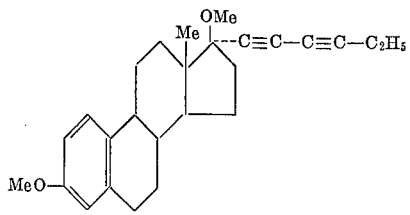

17α - hexa - 1′,3′-diynyl-3-methoxy-oestra-1,3,5(10)-trien-17β-ol (7.5 g.) in anhydrous tetrahydrofuran (200 ml.) was added dropwise to stirred sodamide (from 0.70 g. of sodium and a trace of ferric nitrate) in liquid ammonia (200 ml.) at ca 60° C., and the mixture was stirred for 10 minutes. Methyl iodide (2 mil.) in tetrahydrofuran (10 ml.) was added and the mixture was stirred at ca —60° C. for 2 hours and poured onto ice. The steroidal product was extracted with ether and purified by chromatography on alumina, eluting with toluene and by crystallisation from methanol affording 17α-hexa-1′,3′ - diynyl-3,17β-dimethoxy-oestra-1,3,5(10)-triene, as needles N.M.R. 6.23τ (17β-OMe), 6.60 (3-OMe), 9.136 (18 Me), $\lambda_{max.}^{EtOH}$ 278 mμ (ε, 2045), $\lambda_{max.}^{EtOH}$ 287 mμ (ε, 1925); $\nu_{max.}^{CCl_4}$ 2242, 1609, 1498 cm.$^{-1}$; $\nu_{max.}^{CS_2}$ 1098 cm.$^{-1}$ M.P. 80.5° C., $[\alpha]_D^{21}$—53 (c., 0.22 in dioxan)

EXAMPLE 4

17α-penta-1′,3′-diynyl-androst-5-ene-3β,17β-diol

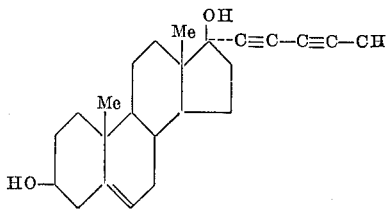

1,4-dichlorobut-2-yne (12.3 g.) was added dropwise with stirring to sodamide (from 7.0 g. of sodium and a trace of ferric nitrate) in refluxing liquid ammonia (250 ml.), followed, after 5 minutes, by methyl iodide (17.5 g.). The mixture was stirred under reflux for 3 hours, cooled to —70° C., and sodamide (from 2.3 g. of sodium and a trace of ferric nitrate) in liquid ammonia (150 ml.) was added. The mixture was stirred for 30 minutes while warming to reflux temperature, androst-5-en-3β-ol-17-one (10 g.) in anhydrous tetrahydrofuran (250 ml.) was added, and the mixture was stirred under reflux for 1½ hours. Solid ammonium chloride was added, the ammonia was allowed to evaporate and the residue was extracted with ether. The ethereal solution was evaporated at reduced pressure and the steroidal product was purified from benzene and then from aqueous methanol, affording 17α-penta-1′,3′-diynyl-androst-5-ene-3β,17β-diol as colourless plates, M.P. 236° C., $[\alpha]_D^{26}$ —167° (c., 0.90 in dioxan); $\lambda_{max.}^{EtOH}$ 227 mμ (ε, 332); 241 mμ (ε, 338); 254.5 mμ (ε, 202); $\nu_{max.}^{Nujol}$ 3490, 2230, 1045 cm.$^{-1}$ 17α-penta-1′,3′-diynyl-androst-4-en-17β-ol-3-one

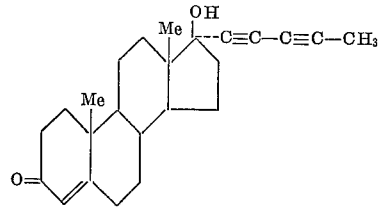

A mixture of 17α-penta-1′3′-diynyl-androst-5-ene-3β,17β-diol (2.0 g.), aluminium isopropoxide (1.7 g.), cyclohexanone (50 ml.) and anhydrous toluene (50 ml.) was heated under reflux for 1 hour, cooled, shaken with saturated Rochelle Salt solution (75 ml.) and the mixture was steam-distilled for 3 hours. After cooling, a solid precipitate was collected and purified by crystallisation from petroleum ether/acetone as lustrous plates M.P. 134.5° C., $\lambda_{max}$ 241 mμ (ε, 14900); $[\alpha]_D^{27}$ —45° (c., 1.20 in dioxan); N.M.R. 4.24τ (4-C), 8.06τ (≡CMe), 8.81τ (19-Me), 9.12τ (18-Me).

EXAMPLE 5

17α-penta-1′,3′-diynyl-4-methyl-oestra-1,3,5(10)-trien-17β-ol

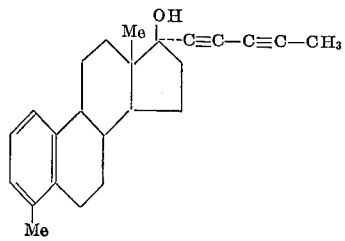

1,4-dichloro-but-2-yne (12.3 g.) was added dropwise with stirring to sodamide (from 7.0 g. of sodium and a trace of ferric nitrate) in refluxing liquid ammonia (250 ml.), followed, after 5 minutes, by methyl iodide (15.5 g.). The mixture was stirred under reflux for 3 hours, cooled to —70° C., and sodamide (from 2.3 g. of sodium and a trace of ferric nitrate) in liquid ammonia (150 ml.) was added. The mixture was stirred for 30 minutes while warming to reflux temperature, 4-methyl-oestra-1,3,5(10)-trien-17-one (10.0 g.) in anhydrous tetrahydrofuran (300 ml.) was added, and the mixture was stirred under reflux for 2 hours. Solid ammonium chloride was added, the ammonia was allowed to evaporate, and the residue was extracted with ether. The ethereal solution was evaporated at reduced pressure and the steroidal product was purified by chromatography on alumina, eluting with toluene, and by crystallisation from methanol, affording 17α-penta-1′,3′ - diynyl-4-methyl-oestra-1,3,5(10)-trien-17β-ol, M.P. 192.5° C. $[\alpha]_D^{27}$ —46° (c., 1.19 in dioxan).

EXAMPLE 6

17α-penta-1′,3′-diynyl-13β-ethyl-3-methoxy-gona-1,3,5(10)-trien-17β-ol

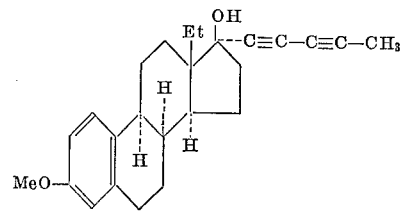

1,4-dichloro-but-2-yne (2.46 g.) was added dropwise with stirring to sodamide (from 1.4 g. of sodium and a trace of ferric nitrate) in refluxing liquid ammonia (60 ml.), followed, after 5 minutes, by methyl iodide (3.1 g.). The mixture was stirred under reflux for 3 hours, cooled to −70° C., and sodamide (from 0.46 g. of sodium and a trace of ferric nitrate) in liquid ammonia (30 ml.) was added. The mixture was stirred for 15 minutes while warming to reflux temperature, 13β-ethyl-3-methoxy-gona-1,3,5(10)-trien-17-one (Herchel Smith et al., J. Chem. Soc., 1964, 4472) (2.0 g.) in anhydrous tetrahydrofuran (75 ml.) was added, and the mixture was stirred under reflux for 1½ hours. Solid ammonium chloride was added, the ammonia was allowed to evaporate, and the residue was extracted with ether. The ethereal solution was evaporated at reduced pressure and the steroidal product was purified by chromatography on alumina, eluting with toluene, affording 17α-penta-1′,3′-diynyl-13β-ethyl-3-methoxy-gona-1,3,5(10)-trien-17β-ol, $\lambda_{max.}^{EtOH}$ 278.5 mμ (ε, 1925), $\lambda_{max.}^{EtOH}$ 287 mμ (ε, 1815); $\nu_{max.}^{CCl_4}$ 3612, 2245, 1610, 1594 cm.$^{-1}$ Similarly, (dl)-3-methoxy-18-ethyloestra-1,3,5(10)-trien-17-one (H. Smith et al., J. Chem. Soc., 1964, 4472) may be treated by the method of this example to give (dl)-17α-(penta-1′,3′-diynyl)-3-methoxy-18-ethyl-oestra-1,3,5(10)-trien-17β-ol.

EXAMPLE 7

17α-(hexa-1′,3′-diynyl)-5α-androst-2-en-17β-ol

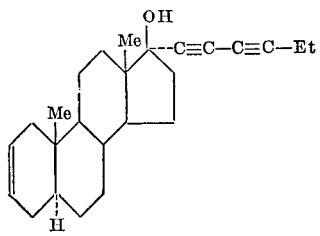

Hexa-1,3-diyne (4.0 g.) was added to lithamide (from 0.28 g. of lithium and a trace of ferric nitrate) in stirred, refluxing liquid ammonia (160 ml.), followed, after 5 minutes, by 5α-androst-2-en-17-one (5.97 g.) (J. Iriarte, G. Rosenkranz and F. Sondheimer, J. Org. Chem., 1955, 20, 542) in anhydrous tetrahydrofuran (250 ml.), and the mixture was stirred under reflux for 2 hours. Solid ammonia chloride was added and the ammonia was allowed to evaporate. Water was added and the steroidal product was isolated by extraction with ether. Purification by crystallisation from methanol gave 17α-(hexa-1′,3′-diynyl)-5α-androst-2-en-17β-ol, M.P. 70° C., identical with the product of Example 20.

EXAMPLE 8

17α-penta-1′,3′-diynyl-oestra-1,3,5(10)-trien-17β-ol

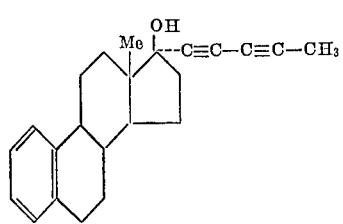

1,4-dichlorobut-2-yne (4.1 g.) was added dropwise with stirring to sodamide (from 2.3 g. of sodium and a trace of ferric nitrate) in refluxing liquid ammonia (100 ml.), followed, after 5 minutes, by methyl iodide (5.2 g.). The mixture was stirred under reflux for 2½ hours, cooled to −70° C., and sodamide (from 0.8 g. of sodium and a trace of ferric nitrate) in liquid ammonia (50 ml.) was added. The mixture was stirred for 15 minutes while warming to reflux temperature, oestra-1,3,5(10)-trien-17-one (3.0 g.) in anhydrous tetrahydrofuran (100 ml.) was added, and the mixture was stirred under reflux for 1½ hours. Solid ammonium chloride was added, the ammonia was allowed to evaporate, and the residue was extracted with ether. The ethereal solution was evaporated at reduced pressure and the steroidal product was purified from chromatography on alumina, eluting with toluene, affording 17α-penta-1′,3′-diynyl-oestra-1,3,5(10)-trien-17β-ol, $\lambda_{max.}^{EtOH}$ 266.5 (ε, 452); $\lambda_{max.}^{EtOH}$ 274 mμ (ε, 435); $\nu_{max.}^{CCl_4}$ 3605, 2240 cm.$^{-1}$

EXAMPLE 9

17α-penta-1′,3′-diynyl-5α-androst-2-en-17β-ol

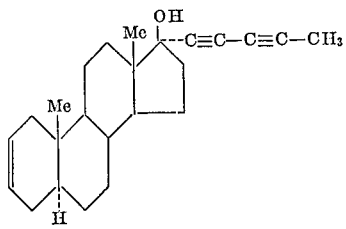

1,4-dichlorobut-2-yne (2.95 g.) was added dropwise with stirring to sodamide (from 1.65 g. of sodium and a trace of ferric nitrate) in refluxing liquid ammonia (75 ml.), followed, after 5 minutes, by methyl iodide (3.7 g.). The mixture was stirred under reflux for 3 hours, cooled to −70° C., and sodamide (from 0.55 g. of sodium and a trace of ferric nitrate) in liquid ammonia (35 ml.) was added. The mixture was stirred for 15 minutes while warming to reflux temperature, 5α-androst-2-en-17-one (2.38 g.) (J. Iriarte, G. Rosenkranz and F. Sondheimer, J. Org. Chem., 1955, 20, 542) in anhydrous tetrahydrofuran (70 ml) was added, and the mixture was stirred under reflux for 1½ hours. Solid ammonium chloride was added, the ammonia was allowed to evaporate, and the residue was extracted with ether. The ethereal solution was evaporated at reduced pressure and the steroidal product was purified by chromatography on alumina, eluting with toluene, affording 17α-penta-1′,3′-diynyl-5α-androst-2-en-17β-ol, $\nu_{max.}^{CCl_4}$ 3603, 2242 cm.$^{-1}$ $\lambda_{max.}^{EtOH}$ 234 mμ (ε, 362) 241 mμ (ε, 369), 256 mμ (ε, 492)

EXAMPLE 10

17α-penta-1′,3′-diynyl-3-methoxy-7α-methyl-oestra-1,3,5(10)-trien-17β-ol

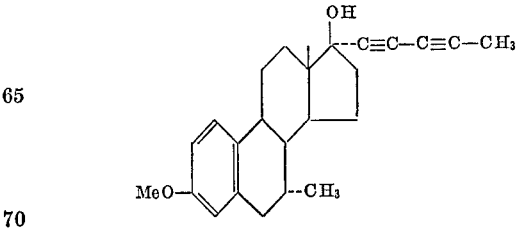

7α-methyl-oestrone 3-methyl ether (Dutch Patent No. 6,415,016) is treated by the method of Example 1 to give 17α-penta-1′,3′-diynyl-3-methoxy-7α-methyl-oestra-1,3,5(10)-trien-17β-ol.

EXAMPLE 11

17α-penta-1′,3′-diynyl-7α-methyl-oestra-1,3,5(10)-trien-3,17β-diol

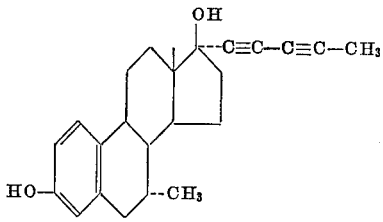

7α-methyl-oestrone (Dutch Patent No. 6,415,016) is treated by the method of Example 33 to give 17α-penta-1′,3′ - diynyl - 7α - methyl - oestra - 1,3,5(10) - trien-3,17β-diol.

EXAMPLE 12

(dl)-17α-(Hexa-1′,3′-diynyl)-3-methoxy-18-methyl-oestra-1,3,5(10),8(9)-tetraen-17β-ol

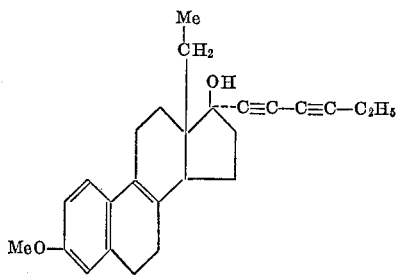

Hexa-1,3-diyne (4.3 g.) was added to sodamide (from 1.3 g. of sodium and a trace of ferric nitrate) in stirred refluxing liquid ammonia (500 ml.). After 5 minutes, (dl) - 3 - methoxy - 18 - methyloestra - 1,3,5(10),8(9)-tetraen - 17 - one (5 g.) (H. Smith et al. J., 1964, 4472) in anhydrous tetrahydrofuran (200 ml.) was added, and the mixture stirred under reflux for 2 hours. Solid ammonium chloride was added, the ammonia allowed to evaporate, and the steroidal product isolated with ether. Crystallisation from light petroleum gave (dl)-17α-(hexa-1′,3′ - diynyl) - 3 - methoxy - 18 - methyloestra - 1,3,5(10),8(9)-tetraen-17β-ol, M.P. 135.5° C., $\lambda_{max.}^{EtOH}$ 223.5 mμ (ε, 15,300) and 279 mμ (ε, 17,900)

Similarly, (dl) - 3 - methoxy - 18 - ethyloestra - 1,3,5(10),8(9)-tetraen-17-one (H. Smith et al., J. 1964, 4472) may be treated by the method of this example to give (dl) - 17α - (hexa - 1′,3′ - diynyl) - 3 - methoxy - 18 - ethyloestra-1,3,5(10),8(9)-tetraen-17β-ol.

EXAMPLE 13

(dl)-17α-(hexa-1′,3′-diynyl)-3-methoxy-18-methyl-8α-oestra-1,3,5(10)-trien-17β-ol

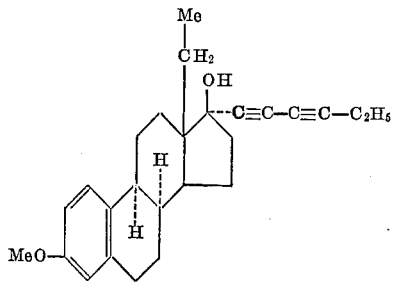

(dl) - 3 - methoxy - 18 - methyloestra - 1,3,5(10),8(9)-tetraen-17-one (5 g.) (H. Smith et al. J., 1964, 4472) in benzene (250 ml.) was hydrogenated in the presence of a 0.5% palladium on charcoal catalyst (2.5 g.), until uptake of hydrogen was complete. The product was isolated and crystallised from methanol to give (dl)-3-methoxy - 18 - methyl - 8α - oestra - 1,3,5(10) - trien - 17-one, needles, M.P. 96.5° C., $\lambda_{max.}^{EtOH}$ 278 mμ (ε, 2,220) and 286 mμ (ε, 2,140)

Hexa-1,3-diyne (4.3 g.) was added to sodamide (from 1.27 g. of sodium and a trace of ferric nitrate) in stirred refluxing liquid ammonia (300 ml.). After 5 minutes, the foregoing steroidal 17-ketone (5 g.) in anhydrous tetrahydrofuran (200 ml.) was added, and the mixture stirred under reflux for 2 hours. Solid ammonium chloride was added, the ammonia allowed to evaporate, and the steroidal product isolated with ether. Crystallisation from methanol gave (dl)-17α-(hexa-1′,3′-diynyl) - 3 - methoxy-18-methyl - 8α - oestra - 1,3,5(10)-trien-17β-ol, M.P. 130° C.

$\lambda_{max.}^{EtOH}$ 221 mμ (ε, 9,640), 226 mμ (ε, 9,530), 278 mμ (ε, 2,100) and 287 mμ (ε, 2,000)

EXAMPLE 14

17α-(5′-cyclopropylpenta-1′,3′-diynyl)-3-methoxy-oestra-1,3,5(10)-trien-17β-ol

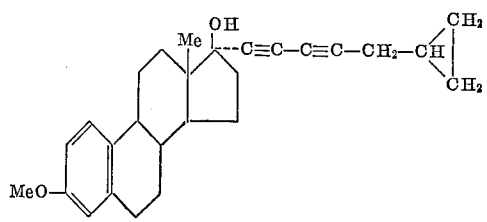

5-cyclopropylpenta-1,3-diyne (5 g.) (prepared from cyclopropylmethyl bromide and monosodio-butadiyne in liquid ammonia) was added to sodamide (from 1.2 g. of sodium and a trace of ferric nitrate) in stirred refluxing liquid ammonia (250 ml.). After 5 minutes, oestrone 3-methyl ether (7 g.) in anhydrous tetrahydrofuran (200 ml.) was added, and the mixture stirred under reflux for 2 hours. Solid ammonium chloride (3 g.) was added, the ammonia allowed to evaporate, and the steroidal product isolated by extraction with ether. A benzene solution of the product was passed through a column of alumina, and the later fractions crystallised from ether-hexane to give 17α-(5′-cyclopropylpenta-1′,3′-diynyl) - 3 - methoxy-oestra-1,3,5(10)-trien-17β-ol as needles, M.P. 73.5° C., $[\alpha]_D^{21}$ −39° (c., 1.3 in chloroform), $\lambda_{max.}^{EtOH}$ 278 mμ (ε, 2,020) and 286 mμ (ε, 1,930)

EXAMPLE 15

17α-(5′-cyclopropylpenta-1′,3′-diynyl)-19-norandrost-4-en-17β-ol-3-one

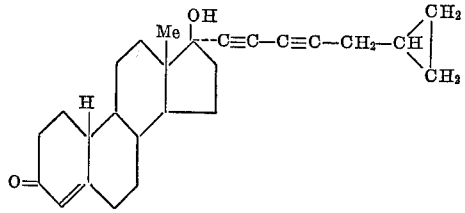

5-cyclopropylpenta-1,3-diyne (5 g.) (prepared from cyclopropylmethyl bromide and monosodio-butadiyne in liquid ammonia) was added to sodamide (from 1.2 g. of sodium and a trace of ferric nitrate) in stirred refluxing liquid ammonia (250 ml.). After 5 minutes, 3-methoxy-oestra-2,5(10)-dien-17-one (7 g.) in anhydrous tetrahydrofuran (200 ml.) was added, and the mixture stirred under reflux for 2 hours. Solid ammonium chloride was added, the ammonia allowed to evaporate, and the steroidal product isolated with ether. Its solution in methanol (100 ml.) and 2 N hydrochloric acid (25 ml.) was heated for 20 minutes at 60° C., and then poured into cold water. Crystallisation of the precipitate from acetone gave 17α-(5′-cyclopropylpenta-1′,3′-diynyl) - 19 - norandrost-4-en-17-ol-3-one prisms, M.P. 244.5° C., $[\alpha]_D^{21}$ −82° (c., 1.07 in chloroform), $\lambda_{max.}^{EtOH}$ 239 mμ (ε, 16,900)

EXAMPLE 16

17α-(n-nona-1′,3′-diynyl)-3-methoxyestra-1,3,5(10)-trien-17β-ol

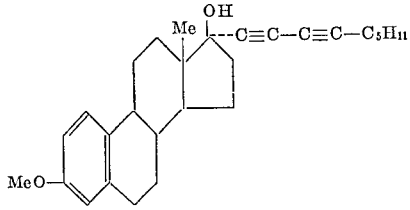

n-Nona-1,3-diyne (7 g.) (prepared from n-amyl bromide and monosodio-butadiyne in liquid ammonia) was added to sodamide (from 1.2 g. of sodium and a trace of ferric nitrate) in stirred refluxing liquid ammonia (250 ml.). After 5 minutes, oestrone 3-methyl ether (7.1 g.) in anhydrous tetrahydrofuran (200 ml.) was added, and the mixture stirred under reflux for 2 hours. Solid ammonium chloride was added, the ammonia allowed to evaporate, and the steroidal product isolated with ether. A solution of the product in benzene was passed through a column of alumina (100 g.) and the later fractions crystallised from ether-hexane to give 17α-(n-nona-1′,3′-diynyl)-3-methoxyoestra-1,3,5-(10)-trien-17β-ol, needles, M.P. 77° C., $[\alpha]_D^{22}$ —41° (C., 0.95 in chloroform), $\lambda_{max.}^{EtOH}$ 278 mμ (ε, 1,970) and 287 mμ (ε, 1,900)

EXAMPLE 17

17α(n-nona-1′,3′-diynyl)-19-norandrost-4-en-17β-ol-3-one

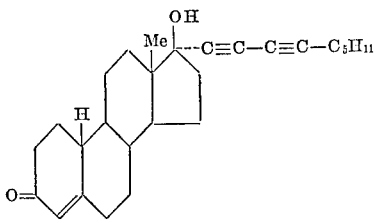

n-Nona-1,3-diyne (5.6 g.) (prepared from n-amyl bromide and monosodio-butadiyne in liquid ammonia) was added to sodamide (from 0.96 g. of sodium and a trace of ferric nitrate) in stirred refluxing liquid ammonia (200 ml.). After 5 minutes, 3-methoxyoestra-2,5(10)-dien-17-one (5.7 g.) in anhydrous tetrahydrofuran (200 ml.) was added, and the mixture stirred under reflux for 2 hours. Solid ammonium chloride was added, the ammonia allowed to evaporate, and the steroidal product isolated with ether. Its solution in methanol (100 ml.) and 2 N hydrochloric acid (25 ml.) was heated for 20 minutes at 60° C., and then poured into cold water. Crystallisation of the precipitate from acetone gave 17α-(n-nona-1′,3′-diynyl) - 19 - norandrost-4-en-17β-ol-3-one, prisms, M.P. 203° C., $[a]_D^{22}$—77° (c., 0.95 in chloroform), $\lambda_{max.}^{EtOH}$ 240 mμ (ε, 16,700)

EXAMPLE 18

17α-(hexa-1′,3′-diynyl)-oestra-1,3,5(10)-triene-3,17β-diol

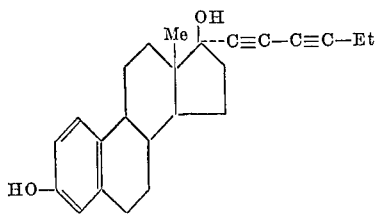

Hexa-1,3-diyne (5.0 g.) was added to sodamide (from 1.15 g. of sodium and a trace of ferric nitrate) in stirred, refluxing liquid ammonia (200 ml.), followed, after 5 minutes, by oestrone (7.5 g.) in anhydrous tetrahydrofuran (320 ml.), and the mixture was stirred under reflux for 2 hours. Solid ammonium chloride was added and the ammonia was allowed to evaporate. Water was added and the steroidal product was isolated by extraction with ether. Unchanged oestrone (2.3 g.) was removed from the product by crystallisation from methanol. Purification of the mother-liquor material from benzene gave 17α-(hexa - 1′,3′ - diynyl) - oestra - 1,3,5(10) - triene - 3,17β-diol, M.P. 129° C., $[\alpha]_D^{22}$ —46° (c., 1.33 in dioxan); $\lambda_{max.}$ 281 mμ (ε 2080), 286 mμ (ε 1890).

EXAMPLE 19

17α-(hexa-1′,3′-diynyl)-androst-5-ene-3β,17β-diol

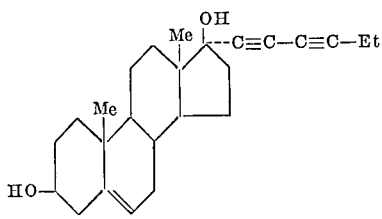

Hexa-1,3-diyne (7.1 g.) was added to sodamide (from 1.64 g. of sodium and a trace of ferric nitrate) in stirred, refluxing liquid ammonia (300 ml.), followed, after 5 minutes, by androst-5-en-3β-ol-17-one (10 g.) in anhydrous tetrahydrofuran (150 ml.), and the mixture was stirred under reflux for 3½ hours. Solid ammonium chloride was added and the ammonia was allowed to evaporate. Water was added and the steroidal product was recovered by extraction with ether. Purification by crystallisation from dichloromethane and from ethyl acetate, afforded 17α-(hexa-1′,3′-diynyl)-androst-5-ene-3β,17β-diol as needles, dried at 80° C., in vacuo, M.P. 144–145° C., $[\alpha]_D^{26}$ —159° (c., 0.60 in dioxan).

EXAMPLE 20

17α-(hexa-1′,3′-diynyl)-5α-androst-2-en-17β-ol

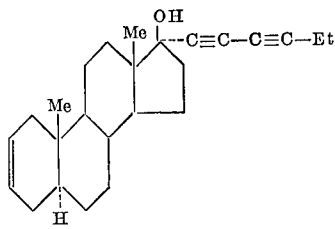

Hexa-1,3-diyne (3.0 g.) was added to sodamide (from 0.69 g. of sodium and a trace of ferric nitrate) in stirred, refluxing liquid ammonia (120 ml.), followed, after 5 minutes, by 5α-androst-2-en-17-one (4.5 g.) (J. Iriarte, G. Rosenkranz and F. Sondheimer, J. Org. Chem. 1955, 20, 542) in anhydrous tetrahydrofuran (190 ml.) and the mixture was stirred under reflux for 3 hours. Solid ammonium chloride was added and the ammonia was allowed to evaporate. Water was added and the steroidal product was isolated by extraction with ether. Purification by crystallisation from methanol, gave 17α - (hexa - 1′,3′-diynyl) - 5α - androst - 2 - en - 17β - ol, M.P. 70° C. $[\alpha]_D^{21}$ —28.5° (c., 0.70 in dioxan);

$\lambda_{max.}^{EtOH}$ 234 mμ (ε, 379), 241 mμ (ε, 382), 256 mμ (ε, 505)

EXAMPLE 21

17α-(hexa-1′,3′-diynyl)-3-methoxy-1-methyl-oestra-1,3,5(10)-trien-17β-ol

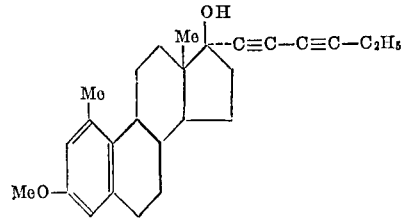

Hexa-1,3-diyne (2.2 g.) was added to sodamide (from 0.6 g. of sodium and a trace of ferric nitrate) in stirred, refluxing liquid ammonia (100 ml.), followed, after 5 minutes, by 1-methyl-oestrone 3-methyl ether (A. S. Dreiding, W. J. Pummer and A. J. Tomasewski, J. Amer. Chem. Soc., 1953, 75, 3159) in anhydrous tetrahydrofuran (130 ml.) and the mixture was stirred under reflux for 2 hours. Solid ammonium chloride was added and the ammonia was allowed to evaporate. Water was added and the steroidal product was isolated by extraction with ether and purified by crystallisation from methanol, affording 17α - (hexa - 1',3' - diynyl) - 3 - methoxy - 1 - methyl-oestra-1,3,5(10)-trien-17β-ol, M.P. 147° C., $[\alpha]_D^{21}$ —27° (c., 1.38 in dioxan);

$\nu_{max.}^{CCl_4}$ 3608, 2250 cm.$^{-1}$

EXAMPLE 22

17α-(hexa-1',3'-diynyl)-17β-hydroxyandrosta-1,4-dien-3-one

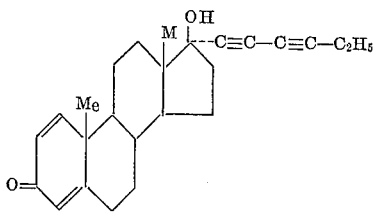

Hexa-1,3-diyne (4.0 g.) was added to sodamide (from 0.825 g. sodium and a trace of ferric nitrate) in refluxing liquid ammonia (250 ml.), followed, after 5 minutes, by androsta-1,4-dien-3,17-dione (5 g.) in anhydrous tetrahydrofuran (200 ml.). The mixture was stirred under reflux for 2 hours, ammonium chloride (3 g.) added and the ammonia allowed to evaporate. Water was added to the residue and the steroidal product isolated with ether. It was purified by chromatography on alumina, followed by recrystallisation from a mixture of acetone and hexane, to give 17α-(hexa-1'-3'-diynyl)-17β-hydroxy-androsta-1,4-dien-3-one, M.P. 200° C., $[\alpha]_D^{22°}$ —20.9° (chloroform), $\lambda_{max.}^{EtOH}$ 243 mμ ($\epsilon$ 14,900)

EXAMPLE 23

17α-(hexa-1',3'-diynyl)-17β-hydroxy-androst-4-ene-3,11-dione

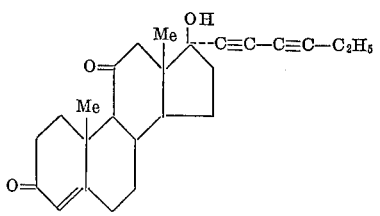

Hexa-1,3-diyne (4.9 g.) was added to sodamide (from 1.35 g. of sodium and a trace of ferric nitrate) in stirred, refluxing liquid ammonia (250 ml.) followed, after 5 minutes, by 3 - ethoxy - androsta - 3,5-diene-11,17-dione (10.1 g.) (C. W. Marshall, J. W. Ralls, F. J. Saunders and B. Riegel, J. Biol. Chem. 1957, 228, 339) in anhydrous tetrahydrofuran (325 ml.), and the mixture was stirred under reflux for 5 hours.

Solid ammonium chloride was added and the ammonia was allowed to evaporate. Water was added and the steroidal product was isolated by extraction with ether and treated in methanol (300 ml.) with 4 N hydrochloric acid (15 ml.) for 1 hour at room temperature. The methanolic solution was poured into water and the precipitate was collected, and dried. Purification from ether/hexane afforded 17α - (hexa-1',3'-diynyl)-17β-hydroxy-androst-4-ene-3,11-dione as needles, dried in vacuo at 110° C., M.P. 127° C., $[\alpha]_D^{25}$ +73° (c., 1.04 in dioxan);

$\lambda_{max.}^{EtOH}$ 237 mμ ($\epsilon$, 15,500)

EXAMPLE 24

17α-(hexa-1',3'-diynyl)-oestra-1,3,5(10-trien-17β-ol

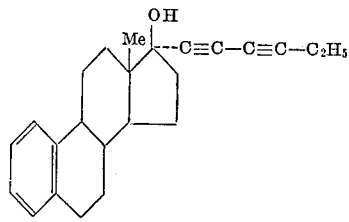

Hexa-1,3-diyne (1.0 g.) was added to sodamide (from 0.3 g. of sodium and a trace of ferric nitrate) in stirred, refluxing riquid ammonia (50 ml.) followed, after 5 minutes, by oestra-1,3,5(10)-trien-17-one (1.3 g.) in anhydrous tetrahydrofuran (50 ml.), and the mixture was stirred under reflux for 3 hours. Solid ammonium chloride was added and the ammonia was allowed to evaporate. Water was added and the steroidal product was isolated by extraction with ether. Purification by chromatography on alumina, eluting with toluene, and by crystallisation from ether/hexane afforded 17α-(hexa-1',3'-diynyl)-oestra-1,3,5(10)-trien-17β-ol, M.P. 184° C. $[\alpha]_D^{22}$—58.5° (c., 1.23 in dioxan).

$\lambda_{max.}^{EtOH}$ 242 mμ ($\epsilon$, 459), 257 mμ ($\epsilon$, 535), 266 mμ ($\epsilon$, 54), 273 mμ ($\epsilon$, 535)

EXAMPLE 25

17α-(penta-1',3'-diynyl)-3-methoxy-oestra-1,3,5(10)-trien-17β-ol

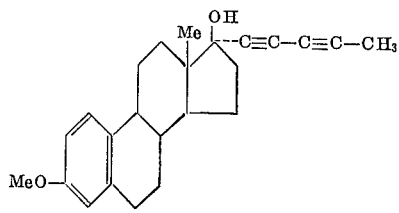

1,4-dichloro-pent-2-yne (1.0 g.) (C. L. Cook, E. R. H. Jones and M. C. Whiting, J. Chem. Soc., 1952, 2883) was added to sodamide (from 0.33 g. of sodium and a trace of ferric nitrate) in liquid ammonia (33 ml.) dropwise, and the mixture was stirred under reflux for 1½ hours. More sodamide (from 0.16 g. of sodium) in liquid ammonia (33 ml.) was added, followed, after 5 minutes, by oestrone 3-methyl ether (2.3 g.) in anhydrous tetrahydrofuran (75 ml.). The mixture was stirred for 4½ hours, treated with ammonium chloide (2 g.) and poured into ice-water. The steroidal product was isolated by extraction with ether and purified by chromatography on alumina, eluting with toluene, and by crystallisation from petroleum ether, affording 17α - (penta - 1',3' - diynyl) - 3 - methoxy-oestra-1,3,5(10)-trien-17β-ol, identical with the product of Example 1.

EXAMPLE 26

17α-(n-hepta-1',3'-diynyl)-3-methoxy-oestra-1,3,5(10)-trien-17β-ol

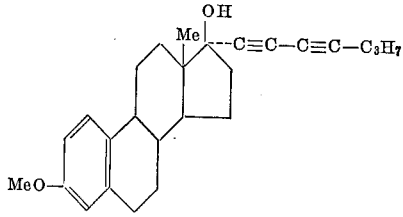

Ethyl bromide (1.18 g.) in anhydrous ether (10 ml.) was added slowly to magnesium (0.25 g.) in anhydrous ether (40 ml.) and the mixture was stirred under nitrogen until reaction ceased. Hepta-1,3-diyne (1.16 g.) in anhydrous ether (5 ml.) was added and the mixture was stirred for 2½ hours at room temperature. Oestrone 3- methyl ether (1.10 g.) in anhydrous tetrahydrofuran (40 ml.) was added and the mixture was stirred for 45 minutes and treated cautiously with aqueous ammonium chloride solution. The steroidal product was isolated by extraction with ether and purified by thin-layer chromatography on silica-gel, eluting with toluene/ethyl acetate, and by crystallisation from hexane, affording 17α-(n-hepta-1',3'-diynyl)-3-methoxy-oestra-1,3,5(10)-trien-17β-ol identical with the product of Example 35.

EXAMPLE 27

17α-(n-hepta-1',3'-diynyl)-androst-5-en-3β,17β-diol

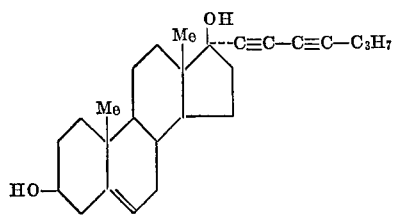

Hepta-1,3-diyne (10.05 g.) was added to sodamide (from 1.97 g. of sodium and a trace of ferric nitrate) in stirred, refluxing liquid ammonia, (360 ml.), followed, after 5 minutes, by 3β-hydroxy-androst-5-en-17-one (12.0 g.) in anhydrous tetrahydrofuran (360 ml.), and the mixture was stirred under reflux for 4 hours. Solid ammonium chloride was added and the ammonia was allowed to evaporate. Water was added and the steroidal product was isolated by extraction with ether. Purification from methanol afforded 17α-(n-hepta-1',3'-diynyl)androst-5-en-3β,17β-diol, M.P. 184.5° C., $[\alpha]_D^{26}$ —161° (c., 1.17 in dioxan).

EXAMPLE 28

17α-(penta-1',3'-diynyl)-17β-hydroxy-19-norandrost-4-en-3-one

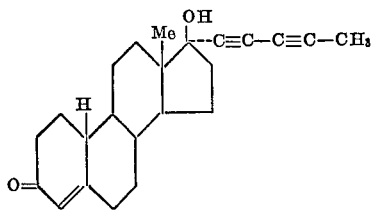

Penta-1,3-diyne (3.35 g.) was added to sodamide (from 1.1 g. of sodium and a trace of ferric nitrate) in stirred, refluxing liquid ammonia (200 ml.), followed, after 5 minutes, by 3 - ethoxy - 19 - norandrosta-3,5-dien-17-one (5.66 g.) (C. Djerassi, L. Miramontes, G. Rosenkranz and F. Sondheimer, J. Amer. Chem. Soc., 1954, 76, 4092) in anhydrous tetrahydrofuran (180 ml.), and the mixture was stirred under reflux for 2 hours. Solid ammonium chloride was added and the ammonia was allowed to evaporate. Water was added and the steroidal product was isolated by extraction with ether. The amorphous 3-ethoxy - 17α - (penta - 1',3' - diynyl) - 18 - norandrosta-3,5-dien-17β-ol ($\nu_{max.}^{CCl_4}$ 3585, 2235, 1650, 1625, 1381 cm.$^{-1}$, $\nu_{max.}^{CS_2}$ 1174, 848 cm.$^{-1}$)

obtained was used for the next stage of the process.

The foregoing compound in methanol (150 ml.) was treated at 60° C. for 15 minutes with 3 N hydrochloric acid (70 ml.). The methanolic solution was poured into water and the precipitate was collected and purified from ether, affording 17α-(penta-1',3'-diynyl)-17β-hydroxy-19-norandrost-4-en-3-one, identical with the product of Example 2.

EXAMPLE 29

17α-(hexa-1',3'-diynyl)-17β-hydroxy-androst-4-en-3-one

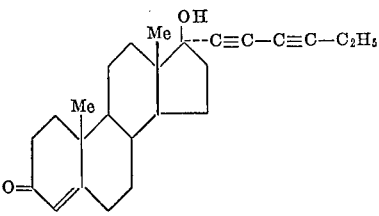

Hexa-1,3-diyne (2.5 g.) was added to sodamide (from 0.80 g. of sodium and a trace of ferric nitrate) in stirred, refluxing liquid ammonia (150 ml.) followed, after 5 minutes, by 3-ethoxy-androsta-3,5-dien-17-one (4.5 g.) in anhydrous tetrahydrofuran (100 ml.), and the mixture was stirred under reflux for 2¼ hours. Solid ammonium chloride was added and the ammonia was allowed to evaporate. Water was added and the steroidal product was isolated by extraction with ether, affording amorphous 3-ethoxy-17α-(hexa-1',3'-diynyl)-androsta-3,5-dien-17β-ol, which was treated in methanol (200 ml.) with 4 N hydrochloric acid (100 ml.) at 65° C. for 15 minutes. The methanolic solution was poured into water and the precipitate was collected and dried. Purification from carbon-tetrachloride and acetone/hexane afforded crystalline 17α-(hexa-1',3'-diynyl)-17β-hydroxy-androst-4-en-3-one, M.P. 125° C., $[\alpha]_D^{27}$ —38° (c., 0.62 in dioxan);

$\lambda_{max.}^{EtOH}$ 240 mμ (ε, 14,200)

containing acetone. Removal of the acetone in vacuo at 130–140° C. afforded the compound in an amorphous state, $[\alpha]_D^{26}$ —39° (c., 0.85 in dioxan).

EXAMPLE 30

(dl)-17α-(hexa-1',3'-diynyl)-17β-hydroxy-18-methyl-19-norandrost-4-en-3-one

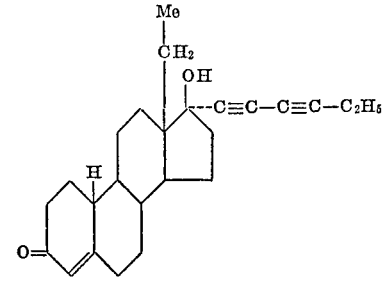

Hexa-1,3-diyne (4.5 g.) was added to sodamide (from 1.3 g. of sodium and a trace of ferric chloride) in refluxing liquid ammonia (200 ml.) followed, after 10 minutes, by (dl) - 3-methoxy-18-methyloestra-2,5(10)-dien-17-one (4.5 g.) (H. Smith et al., J. Chem. Soc., 1964, 4472) in anhydrous tetrahydrofuran (50 ml) and anhydrous ether (50 ml.). The mixture was stirred under reflux for 2 hours and the ammonia was allowed to evaporate. Water was added to the residue and the steroidal product was isolated with ether. A solution of the product (dl)-17α-(hexa-1',3',diynyl)-17β-hydroxy-18-methyl-3 - methoxy - oestra-2,5(10)-diene in methanol (100 ml.) was treated at 60° C. for 15 minutes with dilute hydrochloric acid (20 ml. concentrated hydrochloric acid and 50 ml. water). The solution was diluted with water and the steroidal product was isolated with ether. It was purified from ether, affording (dl)-17α-(hexa-1',3' - diynyl) - 17β - hydroxy-18-methyl-19-norandrost-4-en-3-one, M.P. 138° C., $\lambda_{max.}^{EtOH}$ 240 mμ (ε 16,290)

Similarly (dl)-3-methoxy-18-ethyloestra-2,5(10)-dien-17-one (H. Smith et al., J. Chem. Soc., 1964, 4472) may be treated by the method of this example to give (dl)-17α-(hexa-1',3'-diynyl)-17β-hydroxy-18-ethyl-19 - norandrost-4-en-3-one.

Preparation of starting material for Example 31

The starting material for Example 31 was prepared in the following way.

To a solution of sodium ethoxide (from 20 g. of sodium) in anyhydrous ethanol (500 ml.) was added, slowly with stirring, diethyl methylmalonate (151 g.), followed by m-methoxybenzyl bromide (174 g.) (Lapworth and Shoestring, J. Chem. Soc., 1922, 1391) and the mixture was stirred under reflux for two hours. Water was added and the product, isolated with ether, was distilled under reduced pressure to give diethyl (m-methoxybenzyl)methylmalonate, B.P. 138–142° C./0.3 mm., $\eta_D^{28}$ 1.4902.

The foregoing ester (307 g) was added slowly to a solution of potassium hydroxide (290 g.) in water (300 ml.) and the mixture was refluxed for 2 hours. The cold solution was acidified with concentrated hydrochloric acid and the precipitated solid was collected. Crystallisation from water gave (m-methoxybenzyl)methylmalonic acid, M.P. 146–147° C.

The foregoing acid (62.5 g.) was heated at 200° C. for two hours and then distilled under reduced pressure to give (dl)-α-(m-methoxybenzyl)propionic acid, B.P. 140–144° C./1 mm., $\eta_D^{23.5}$ 1.5218.

A solution of the foregoing acid (225 g.) in anhydrous ether (250 ml.) was slowly added to a stirred suspension of lithium aluminum hydride (70 g.) in anhydrous ether (500 ml.) and the mixture was stirred under reflux for 2 hours. The mixture was cooled, excess reagent was decomposed by cautious addition of water followed by dilute sulphuric acid. The product, isolated with ether, was distilled under reduced pressure to give (dl)-2-(m-methoxybenzyl)propan-1-ol, B.P. 116° C./1 mm., $\eta_D^{24}$ 1.5225.

To a cooled and stirred solution of the foregoing alcohol (180 g.) in anhydrous benzene (300 ml.) was slowly added a solution of phosphorous tribromide (135 g.) in anhydrous benzene (150 ml.) and the mixture was stirred under reflux for 4 hours. The cooled solution was poured onto crushed ice and the product, isolated with ether, was distilled under reduced pressure to give (dl)-1-bromo-2-(m-methoxybenzyl)propane, B.P. 104° C./0.4 mm., $\eta_D^{25}$ 1.5405.

To a stirred suspension of magnesium (114 g.) in anhydrous tetrahydrofuran (200 ml.) was added dropwise, the foregoing bromide (114 g.). The resulting solution was poured onto an excess of solid carbon dioxide which was allowed to evaporate. Water was added to the residue, the solution was acidified with concentrated hydrochloric acid and the product was isolated with ether. Distillation under reduced pressure gave (dl)-β-(m-methoxybenzyl)butyric acid, B.P. 152° C./0.5 mm., $\eta_D^{25}$ 1.5198.

A suspension of the foregoing acid (43 g.) and polyphosphoric acid (125 ml.) was heated at 100° C. and shaken vigorously for 45 minutes. The resulting solution was poured onto crushed ice and stirred until a colourless solid was obtained. This was collected and crystallised from light petroleum (B.P. 40–60° C.) to give (dl)-6-methoxy-3-methyltetral-1-one, M.P. 72.5° C.

A solution of the foregoing tetralone (25 g.) in anhydrous ether (120 ml.) and anhydrous tetrahydrofuran (60 ml.) was added at −20° C. under nitrogen to a solution of vinylmagnesium bromide (prepared from 12.5 g. magnesium and 75 ml. vinyl bromide) in anhydrous tetrahydrofuran (120 ml.). The mixture was stirred at room temperature for 30 minutes and under reflux for 90 minutes. Aqueous ammonium chloride was added slowly to the cooled solution and the product was isolated with ether. Its solution in xylene (50 ml.) was added over 30 minutes to a refluxing solution of 2-methylcyclopentane-1,3-dione (15 g.) in xylene (250 ml.) and triethylenediamine (9 g.) and reflux was continued for a further 2 hours. Most of the xylene was evaporated under reduced pressure, water was added to the residue and the product was isolated with ether. Crystallisation from light petroleum (B.P. 40–60° C.) gave (dl)-3-methoxy-7ξ-methyl-8(14)-secooestra-1,3,5(10),9(11)-tetraene-14,17-dione, M.P. 76° C., $\lambda_{max.}^{EtOH}$ 266 m$\mu$ ($\epsilon$ 17,060)

A soltuion of the foregoing diketone (20 g.) in methanol (360 ml.) and 2N hydrochloric acid (50 ml.) was refluxed under nitrogen for 45 minutes and diluted with water. The product, isolated with ether, crystallised from ether to give (dl)-3-methoxy-7ξmethyloestra-1,3,5(10),8,14-pentaen-17-one, M.P. 153° C., $\lambda_{max.}^{EtOH}$ 317 m$\mu$ ($\epsilon$ 29,850)

The foregoing product (15 g.) was hydrogenated in benzene (150 ml.) over 5% palladium calcium carbonate (4 g.). The catalyst was filtered off, the filtrate was evaporated to dryness and the residue was crystallised from methanol to give (dl)-3-methoxy-7ξ-methyloestra-1,3,5(10),8-tetraen-17-one, M.P. 101.5° C., $\lambda_{max.}^{EtOH}$ 277 m$\mu$ ($\epsilon$ 16,630)

EXAMPLE 31

(dl)-17α-(hexa-1,3'-diynyl)-3-methoxy-7ξ-methyl-oestra-1,3,5(10),8-tetraen-17β-ol

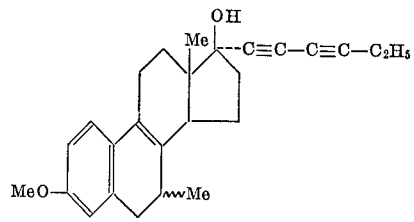

Hexa-1,3-diyne (2.5 g.) was added to sodamide (from 0.7 g. of sodium and a trace of ferric nitrate) in refluxing liquid ammonia (100 ml.) followed, after 5 minutes, by (dl) - 3 - methoxy - 7ξ - methyloestra - 1,3,5(10),8-tetraen-17-one (1.2 g.) in anhydrous tetrahydrofuran (50 ml.). The mixture was stirred under reflux for 2 hours and the ammonia was allowed to evaporate. Water was added to the residue and the steroidal product was isolated with ether. Chromatography of the product on alumina, followed by crystallisation from ether-light petroleum (B.P. 40° to 60°) affords (dl)-17α-(hexa-1',3'-diynyl) - 3 - methoxy - 7ξ - methyloestra - 1,3,5(10),8-tetraen-17β-ol, M.P. 122° C., $\lambda_{max.}^{EtOH}$ 277 m$\mu$ ($\epsilon$ 19,300)

EXAMPLE 32

3-(2-diethylamino-ethoxy)-17α-(hexa-1',3'-diynyl)-oestra-1,3,5(10)-trien-17β-ol

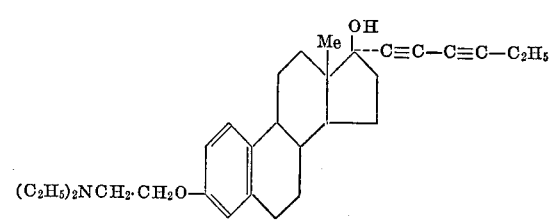

Hexa-1,3-diyne (0.75 g.) was added to sodamide (from 0.21 g. of sodium and a trace of ferric nitrate) in stirred, refluxing liquid ammonia (100 ml.), followed, after 5 minutes, by 3-(2'-diethylaminoethoxy)-oestra-1,3,5(10)-trien-17-one (1.85 g.) (F. Bergel and A. R. Todd, Biochem. Journal, 1938, 32, 2145) in anhydrous tetrahydrofuran (65 ml.), and the mixture was stirred under reflux for 2 hours. Solid ammonium chloride was added and the ammonia was allowed to evaporate. Water was added and the steroidal product was isolated by extraction with ether. An ethereal solution of the product was shaken with 2N aqueous hydrochloric acid (150 ml.). The aqueous layer was separated and made alkaline, and the steroidal product was recovered by extraction with ether, affording 3-(2'-diethylamino-ethoxy)-17α-(hexa-1',3'-diynyl)-testra-1,3,5(10)-trien-17β-ol, [α]$_D^{27}$—40° (c., 0.85 in EtOH).

To a stirred solution of the foregoing compound (0.25 g.) in anhydrous ether (10 ml.) was added dropwise a solution of maletic acid (0.21 g.) in anhydrous ether (25 ml.). The crystalline precipitate was collected, washed with ether and dried, affording 3-(2'-diethylamino-ethoxy) - 17α - (hexa - 1',3' - diynyl) - oestra - 1,3,5(10)-trien-17β-ol maleate, [α]$_D^{27}$—34° (c., 0.83 in EtOH) M.P. 145° C.

EXAMPLE 33

17α-(penta-1',3'-diynyl)-oestra-1,3,5(10)-triene-3,17β-diol

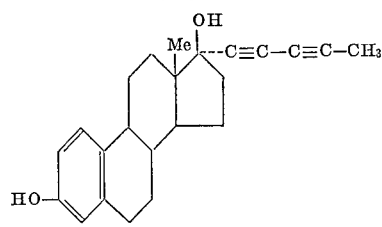

Penta-1,3-diyne (4.09 g.) was added to sodamide (from 1.15 g. of sodium and a trace of ferric nitrate) in stirred, refluxing liquid ammonia (200 ml.), followed, after 5 minutes, by oestrone (7.5 g.) in anhydrous tetrahydrofuran (320 ml.) and the mixture was stirred under reflux for 3 hours. Solid ammonium chloride was added and the ammonia was allowed to evaporate. Water was added and the steroidal product was isolated by extraction with ether. Purification from ether and from ether/petroleum ether afforded 17α-(penta-1',3'-diynyl)-oestra-1,3,5(10)-triene-3,17β-diol, M.P. 148–158° (efferv., λ$_{max.}$ 281 mμ (ε 1870), λ$_{inf.}$ 287 mμ (ε1700), [α]$_D^{30}$—48° (c., 0.81 in dioxan).

EXAMPLE 34

17α-hexa-1',3'-diynyl-3-methoxy-oestra-2,5(10)-dien-17β-ol

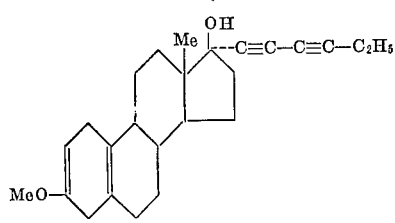

Hexa-1,3-diyne (5.0 g.) was added to sodamide (from 1.15 g. of sodium and a trace of ferric nitrate) in stirred, refluxing liquid ammonia (200 ml.), followed, after 5 minutes, by 3-methoxy-oestra-2,5(10)-diene-17-one (7.0 g.) in anhydrous tetrahydrofuran (200 ml.), and the mixture was stirred, under reflux, for 2 hours. Solid ammonium chloride (3 g.) was added and the ammonia was alowed to evaporate. The steroidal product was recovered by extraction with ether and purified by crystallisation from MeOH, affording 17α-hexa-1',3'-diynyl-3-methoxy-oestra-2,5(10)-dien-17β-ol, M.P. 91° C., [α]$_D^{26}$+35° (c., 0.9 in dioxane);

$\nu_{max.}^{CCl_4}$ 3605, 2240, 1695, 1667 cm.$^{-1}$; $\nu_{max.}^{CS_2}$ 1223, 1022 cm.$^{-1}$ 17α-hexa-1',3'-diynyl-19-norandrost-4-en-17β-ol-3-one

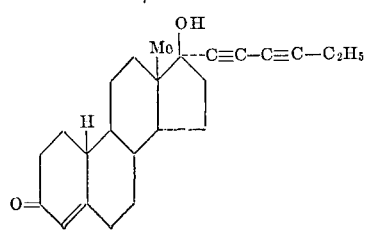

17α - hexa - 1',3' - diynyl - 3 - methoxy-oestra-2,5(10)-dien-17β-ol, (0.8 g.) in methanol (30 ml.) was treated at 60° C. for 15 minutes with 3 N aqueous hydrochloric acid (15 ml.). The solution was cooled and poured into ice-water and the resulting precipitate was collected, washed with water, dried, and purified by crystallisation from methanol affording 17α - hexa - 1',3' - diynyl-19-norandrost - 4 - en-17β-ol-3-one, M.P. 163° C., [α]$_D^{26}$ —101° (c., 0.6 in dioxan);

λ$_{max.}^{EtOH}$ 240 mμ (ε, 17,300); $\nu_{max.}^{CCl_4}$ 3605, 2235, 1679, 1620 cm.$^{-1}$; $\nu_{max.}^{CS_2}$ 1255, 1048 cm.$^{-1}$

EXAMPLE 35

17α-n-hepta-1',3'-diynyl-3-methoxy-oestra-1,3,5(10)-trien-17β-ol

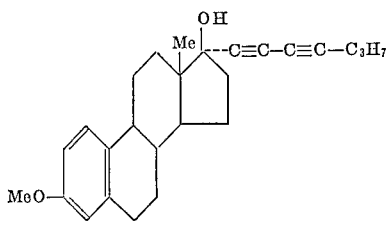

n-Hepta-1,3-diyne (5.0 g.) (C. Prevost, Ann. Chim., 1928, 10, 113) was added to sodamide (from 1.15 g. of sodium and a trace of ferric nitrate) in stirred, refluxing liquid ammonia (200 ml.), followed, after 5 minutes, by oesterone-3-methyl ether (8.0 g.) in anhydrous tetrahydrofuran (250 ml.) and the mixture was stirred, under reflux, for 2 hours. Solid ammonium chloride (3 g.) was added and the ammonia was allowed to evaporate. The steroidal product was recovered by extraction with ether and purified by chromatography on alumina, eluting with toluene, and by crystallisation from hexane, affording 17α - n - hepta - 1',3' - diynyl-3-methoxy-oestra-1,3,5(10)-trien-17β-ol as fine colourless needles, M.P. 65.5°; [α]$_D$ —48.5° (c., 0.67 in dioxan); λ$_{max.}$ 220 mμ (ε, 8700), 279 mμ (ε, 1980), 287 mμ (ε, 1890); λ$_{inf.}$ 259 mμ (ε, 587);

$\nu_{max.}^{CCl_4}$ 3610, 2240, 1610, 1497 cm.$^{-1}$; $\nu_{max.}^{CS_2}$ 1256, 1044 cm.$^{-1}$

EXAMPLE 36

17α-n-hepta-1',3'-diynyl-3-methoxy-oestra-2,5(10)-dien-17β-ol

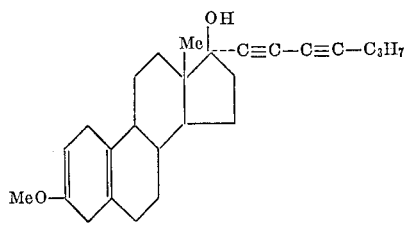

n-Hepta-1,3-diyne (5.0 g.) was added to sodamide (from 1.15 g. of sodium and a trace of ferric nitrate) in stirred, refluxing liquid ammonia (200 ml.), followed, after 5 minutes, by 3-methoxy-oestra-2,5(10)-dien-17-one (7.0 g.) in anhydrous tetrahydrofuran (200 ml.) and the mixture was stirred, under reflux, for 2 hours. Solid ammonium chloride (3 g.) was added and the ammonia was allowed to evaporate. The steroidal product was isolated by extraction with ether, affording 17α-n-hepta-1',3'-diynyl-3-methoxy-oestra-2,5(10)-dien-17β-ol, $\nu_{max.}^{CCl_4}$ 3604, 2245, 1695, 1666 cm.$^{-1}$ used in the next stage.

17α-n-hepta-1′,3′-diynyl-19-norandrost-4-
en-17β-ol-3-one

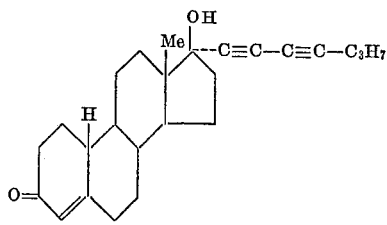

The foregoing compound, in methanol (250 ml.), was treated at 60° C. for 15 minutes, with 3 N aqueous hydrochloric acid (125 ml.). The solution was cooled and the solid which separated (6.3 g.) was collected and purified from methanol/methylene chloride, affording 17α - n - hepta - 1′,3′ - diynyl - 19 - norandrost - 4 - en-17β-ol-3-one, M.P. 199.5° C., $[\alpha]_D^{26}$ —95° (c., 1.0 in dioxan);

$\lambda_{max.}^{EtOH}$ 240 mμ (ε, 17,100); $\nu_{max.}^{Nujol}$ 3698, 1677, 1622 cm.$^{-1}$

EXAMPLE 37

17α-n-octa-1′,3′-diynyl-3-methoxy-oestra-
1,3,5(10)-trien-17β-ol

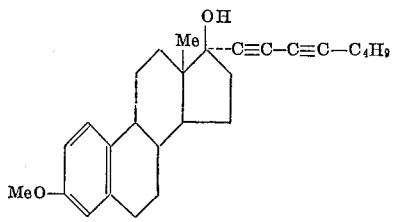

n-Octa-1,3-diyne (5.3 g.) was added to sodamide (from 1.2 g. of sodium and a trace of ferric nitrate) in stirred, refluxing, liquid ammonia (250 ml.), followed after 5 minutes, by oestrone 3-methyl ether (7.1 g.) in anhydrous tetrahydrofuran (200 ml.) and the mixture was stirred under reflux for 2 hours. Solid ammonium chloride was added and the ammonia was allowed to evaporate. The steroidal product was recovered by extraction with ether and purified by chromatography on alumina, eluting with mixtures of petroleum ether and benzene, and by crystallisation from hexane, affording 17α-n-octa-1′,3′-diynyl-3-methoxy-oestra - 1,3,5(10)-trien-17β-ol, M.P. 74.5° C., $[\alpha]_D^{26}$ —40° (c., 1.1 CHCl$_3$);

$\lambda_{max.}^{EtOH}$ 278 mμ (ε, 1990), 287 mμ (ε, 1870); $\lambda_{inf.}^{EtOH}$ 259 mμ (ε, 410), 219.5 mμ (ε, 8900)

EXAMPLE 38

17α-n-octa-1′,3′diynyl-19-norandrost-4-en-17β-ol-3-one

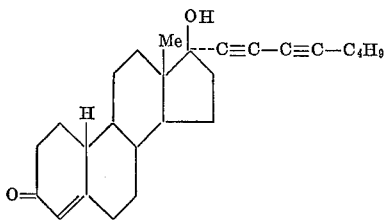

n-Octa-1,3-diyne (5.3 g.) was added to sodamide (from 1.2 g. of sodium and a trace of ferric nitrate) in stirred, refluxing liquid ammonia (250 ml.) followed almost immediately by 3-methoxy-oestra-2,5(10)-dien-17-one (7.1 g.) in anhydrous tetrahydrofuran (200 ml.) and the mixture was stirred under reflux for 2 hours. Solid ammonium chloride was added and the ammonia was allowed to evaporate. The steroidal product was recovered by extraction with ether and treated at 60° C., in methanol (100 ml.) with dilute hydrochloric acid for 20 minutes. The methanolic solution was poured into ice-water and the resulting precipitate collected and purified from methanol/methylene chloride, affording 17α-n-octa-1′,3′ - diynyl - 19 - norandrost-4-en-17β-ol-3-one, M.P. 228.5° C., $[\alpha]_D^{26}$ —81° (c., 1.2 in CHCl$_3$);

$\lambda_{max.}^{EtOH}$ 239 mμ (ε, 17,000)

EXAMPLE 39

17α-hexa-1′,3′-diynyl-4-methyl-oestra-1,3,5(10)-
trien-17β-ol

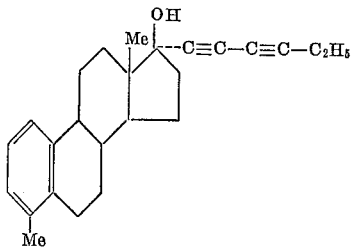

Hexa-1,3-diyne (5.0 g.) was added to sodamide (from 1.15 g. of sodium and a trace of ferric nitrate) in stirred, refluxing liquid ammonia (200 ml.), followed, after 5 minutes, by 4-methyl-oestra-1,3,5(10)-trien-17-one (7.0 g.) in anhydrous tetrahydrofuran (200 ml.) and the mixture was stirred under reflux for 2 hours. Solid ammonium chloride was added and the ammonia was allowed to evaporate. The steroidal product was recovered by extraction with ether and purified by chromatography on an alumina column, eluting with toluene, and by crystallisation from methanol, affording 17α-hexa-1′,3′-diynyl-4-methyl-oestra-1,3,5(10)-trien-17β-ol, $\lambda_{max.}$ 241 mμ (ε, 378), 255 mμ (ε, 369);

$\nu_{max.}^{CCl_4}$ 3623, 2245 cm.$^{-1}$, M.P. 189° C., $[\alpha]_D^{21}$ —45° (c., 0.6 in dioxan)

EXAMPLE 40

3-methoxy-17α(16′-methylhepta-1′,3′-diynyl)oestra-
1,3,5(10)-trien-17β-ol

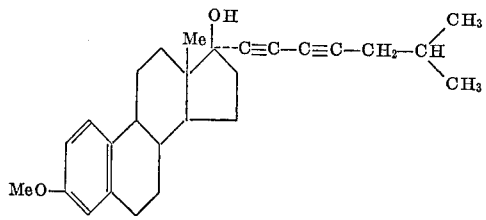

6-methylhepta-1,3-diyne (5.3 g.) (prepared from 1,4-dichlorobut-2-yne, sodamide and iso-butyl-bromide in liquid ammonia) was added to sodamide (from 1.2 g. of sodium) in stirred, refluxing liquid ammonia (200 ml.), followed, after 5 minutes, by a solution of oestrone methyl ether (7.1 g.) in anhydrous tetrahydrofuran (200 ml.). The mixture was stirred for 2 hours, ammonium chloride was added, and the ammonia was allowed to evaporate. The steroid was recovered by extraction with ether and purified by chromatography on alumina (150 g.), eluting with benzene. Crystallisation from hexane gave 3-methoxy-17α-(6′-methylhepta-1′,3′-diynyl)oestra-1,3,5(10)-trien-17β-ol as needles, M.P. 91° C., $[\alpha]_D^{27}$ —40.9° (c., 0.45 in CHCl$_3$).

EXAMPLE 41

17β-hydroxy-17α-(6′-methylhepta-1′,3′-diynyl-
19-norandrost-4-en-3-one

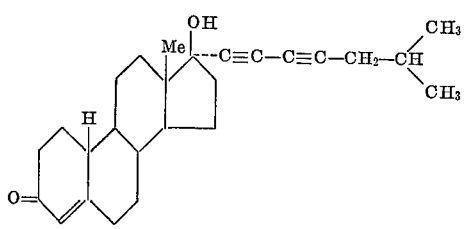

6-methylhepta-1,3-diyne (5.3 g.) (prepared as in Example 40) was added to sodamide (from 1.2 g. of sodium) in stirred, refluxing liquid ammonia (200 ml.), followed, after 5 minutes, by a solution of 3-methoxyoestra-2,5(10)-dien-17-one (7 g.) in anhydrous tetrahydrofuran (200 ml.). The mixture was stirred for 2 hours, ammonium chloride was added and the ammonia was allowed to evaporate. The steroid, recovered by extraction with ether, was treated at 60° C. in methanol (100 ml.) with dilute hydrochloric acid for 20 minutes. Dilution with water and purification of the precipitated material from aqueous methanol gave 17β-hydroxy-17α-(6' - mehtylhepta-1',3'-diynyl)-19-norandrost-4-en-3-one as prisms, M.P. 227.5° C., $[\alpha]_D^{26}$ —82.7° (c., 0.5 in $CHCl_3$), $\lambda_{max.}^{EtOH}$ 240 m$\mu$ ($\epsilon$, 16,500)

EXAMPLE 42

17α-(hexa-1',3'-diynyl)-17β-hydroxyandrosta-4,6-dien-3-one

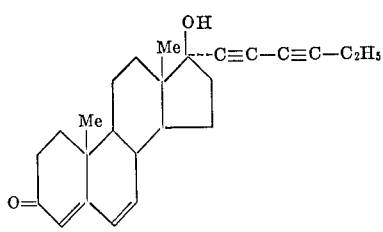

Hexa-1,3-diyne (4.0 g.) was added to sodamide (from 0.825 g. of sodium and a trace of ferric nitrate) in refluxing liquid ammonia (250 ml.), followed, after 5 minutes, by androsta-4,6-dien-3,17-dione (5.0 g.) in anhydrous tetrahydrofuran (200 ml.). The mixture was stirred under reflux for 3 hours, ammonium chloride (3 g.) added and the ammonia allowed to evaporate. Water was added to the residue and the steroidal product isolated with ether. The product was purified by chromatography on alumina, followed by recrystallisation from a mixture of acetone and hexane, affording 17α-(hexa-1',3' - diynyl)-17β-hydroxyandrosta-4,6-dien-3-one, M.P. 219° C., $[\alpha]_D^{22°}$ —313.8° (chloroform), $\lambda_{max.}^{EtOH}$ 284 m$\mu$ ($\epsilon$ 25,500)

EXAMPLE 43

17α-(hexa-1',3'-diynyl)-17β-hydroxy-6-methylandrosta-4,6-dien-3-one

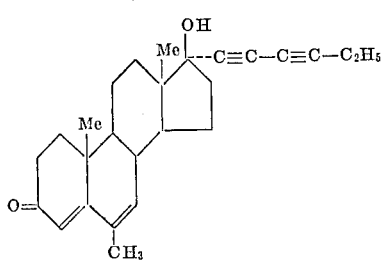

Hexa-1,3-diyne (2 g.) was added to sodamide (from 0.41 g. of sodium and a trace of ferric nitrate) in refluxing liquid ammonia (125 ml.), followed, after 10 minutes, by 6-methylandrosta-4,6-dien-3,17-dione (2.5 g.) (Ellis, et al. J. Chem. Soc. 1960, 2828) in anhydrous tetrahydrofuran (100 ml.). The mixture was stirred under reflux for 3 hours, ammonium chloride (1.5 g.) added, and the ammonia allowed to evaporate. Water was added to the residue, and the steroidal product isolated with ether. It was purified by chromatography on alumina, followed by recrystallization from acetone, affording 17α-(hexa-1',3'-diynyl) - 17β - hydroxy-6-methylandrosta-4,6-dien-3-one, M.P. 263–5° C., $[\alpha]_D^{31°}$ —244° (chloroform), $\lambda_{max.}^{EtOH}$ 289 m$\mu$ ($\epsilon$ 22,330)

EXAMPLE 44

17α-(hexa-1',3'-diynyl)-17β-hydroxy-6α-methylandrost-4-en-3-one

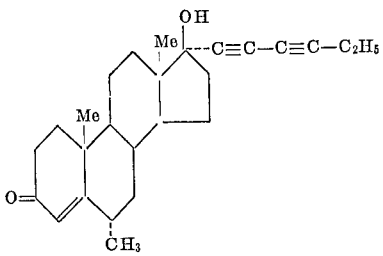

Hexa-1,3-diyne (3.2 g.) was added to sodamide (from 0.58 g. of sodium and a trace of ferric nitrate) in refluxing liquid ammonia (250 ml.), followed, after 5 minutes, by 3-methoxy-6-methylandrosta-3,5-dien-17-one (4 g.) (Burn et al. Tetrahedron, 1965, 21, 569) in anhydrous tetrahydrofuran (180 ml.). The mixture was stirred under reflux for 2 hours, ammonium chloride (2 g.) added, and the ammonia allowed to evaporate. Water was added and the steroidal product [17α-(hexa-1',3'-diynyl)-17β-hydroxy - 3 - methoxy - 6-methylandrosta-3,5-diene] was isolated with ether. A solution of the product in methanol (80 ml.) was treated at 60° C. for 30 minutes with 2 N hydrochloric acid (8 ml.). The solution was concentrated to 40 ml., diluted with water (40 ml.) and the product isolated with ether. It was purified by recrystallization from acetone, to give 17α-(hexa-1',3'-diynyl)-17β-hydroxy-6α-methylandrost-4-en-3-one, M.P. 215.5° C. to 216.5° C., $[\alpha]_D^{28}$ —17.9° (in $CHCl_3$), $\lambda_{max.}^{EtOH}$ 240 m$\mu$ ($\epsilon$ 15,600)

EXAMPLE 45

17α-(hexa-1',3'-diynyl)-17β-hydroxy-19-norandrost-4-en-3-one

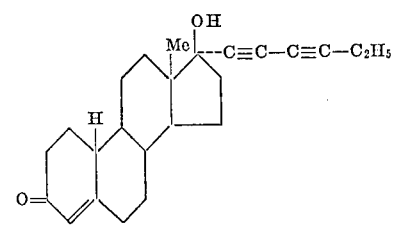

Hexa-1,3-diyne (4.26 g.) was added to sodamide (from 1.17 g. of sodium and a trace of ferric nitrate) in stirred, refluxing liquid ammonia (150 ml.), followed after 5 minutes, by 3-ethoxy-19-norandrosta-3,5-dien - 17 - one (5.46 g.) (C. Djerassi, L. Miramontes, G. Rosenkranz and F. Sondheimer, J. Amer. Chem. Soc., 1954, 76, 4092) in anhydrous tetrahydrofuran (150 ml.), and the mixture was stirred under reflux for 3 hours. Solid ammonium chloride was added and the ammonium was allowed to evaporate. Water was added and the steroidal product was isolated by extraction with ether. The amorphous 3-ethoxy - 17α-(hexa-1',3'-diynyl)-19-norandrosta-3,5-dien-17β-ol obtained was dissolved in methanol (150 ml.), concentrated hydrochloric acid (0.25 ml.) was added, and the mixture was warmed for 15 minutes and poured into water. The resulting precipitate was extracted with ether and purified by chromatography on alumina, eluting with toluene/ether mixtures, and by crystallization from methanol/petroleum ether, affording 17α-(hexa-1',3'-diynyl)-17β-hydroxy-19-norandrost-4-en-3-one, M.P. 163° C., identical with the product of Example 34.

EXAMPLE 46

17α-(hepta-1',3'-diynyl)-17β-hydroxy-19-norandrost-4-en-3-one

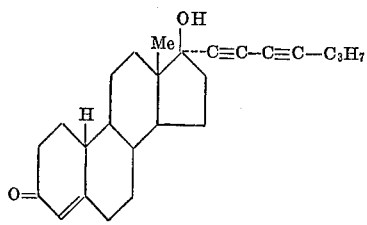

Hepta-1,3-diyne (4.53 g.) was added to sodamide (from 1.05 g. of sodium and a trace of ferric nitrate) is stirred, refluxing liquid ammonia (200 ml.), followed, after 5 minutes, by 3-ethoxy-19-norandrosta-3,5-dien-17-one (6.0 g.)(C. Djerassi, L. Miramontes, G. Rosenkranz and F. Sondheimer, J. Amer. Chem. Soc., 1954, 76, 4092) in anhydrous tetrahydrofuran (230 ml.), and the mixture was stirred under reflux for 2 hours. Solid ammonium chloride was added and the ammonia was allowed to evaporate. Water was added and the steroidal product was isolated by extraction with ether. The amorphous 3-ethoxy-17α-(hepta-1',3'-diynyl)-19-norandrosta-3,5-dien-17β-ol obtained was dissolved in methanol (300 ml.) and treated at 60° C. for 15 minutes with 3 N hydrochloric acid (190 ml.). Water was added and the percipitate was collected and purified from methylene chloride/methanol affording 17α-(hepta-1',3'-diynyl)-17β-hydroxy-19-norandrost-4-en-3-one, M.P. 199.5° C., identical with the product of Example 36.

EXAMPLE 47

17α-(hexa-1',3'-diynyl)-17β-hydroxy-6α-methyl-19-norandrost-4-en-3-one

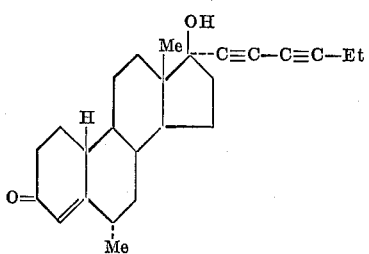

Hexa-1,3-diyne (3.7 g.) was added to sodamide (from 0.85 g. of sodium and a trace of ferric nitrate) in stirred, refluxing liquid ammonia (250 ml.), followed, after 5 minutes, by 3 - ethoxy-6-methyl-19-norandrosta-3,5-dien-17-one [M.P. 155° C., $[\alpha]_D^{26}$ —139° (in CHCl$_3$), $\lambda_{max.}$ 247 m$\mu$ ($\epsilon$ 19,150)] (5.7 g.) in anhydrous tetrahydrofuran (200 ml.). The mixture was stirred under reflux for 2 hours, ammonium chloride (2 g.) added, and the ammonia allowed to evaporate. Water was added, and the steroidal product was isolated with ether to give, after chromatography on alumina, 17α-(hexa-1',3'-diynyl)-3-ethoxy - 17β - hydroxy-6-methyl-19-norandrosta-3,5-diene ($\lambda_{max.}$ 3400, 1650 and 1625 cm.$^{-1}$). This compound (2 g.) in ethanol (10 ml.) was treated with 2 drops of 2 N hydrochloric acid and the mixture heated briefly on the steam bath. After addition of water, the product was isolated with ether, and purified by thin layer chromatography to give 17α- (hexa - 1',3' - diynyl) - 17β-hydroxy-6α-methyl-19-norandrost-4-en-3-one, $[\alpha]_D^{31}$ —94° (c., 0.9 in CHCl$_3$), $\lambda_{max.}$ 240 m$\mu$ ($\epsilon$ 14,650).

We claim:
1. 17α-alka-1',3'-diynyl steroids having the formula

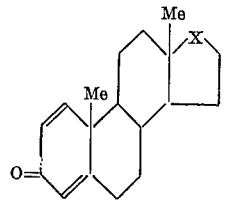

where

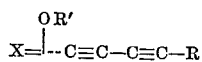

where R is an alkyl group containing up to 5 carbon atoms and R' is H or R.

2. 17α-alka-1',3'-diynyl steroids having the formula

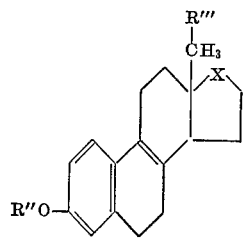

where R'''=Me or Et and R''=H or an alkyl group containing not more than 12 carbon atoms and

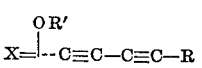

where R is an alkyl group containing up to 5 carbon atoms and R' is H or R.

3. 17α-alka-1',3'-diynyl steroids having the formula

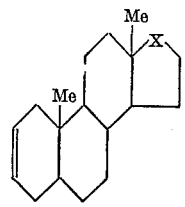

where

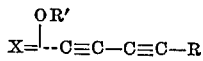

where R is an alkyl group containing up to 5 carbon atoms and R' is H or R.

4. 17α-alka-1',3'-diynyl steroids having the formula

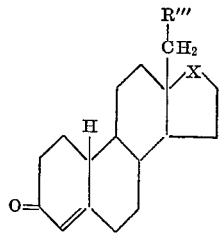

where R'''=Me or Et and

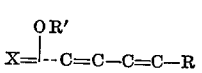

where R is an alkyl group containing up to 5 carbon atoms and R' is H or R.

5. 17α-alka-1′,3′-diynyl steroids having the formula

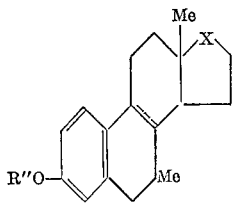

where R″=H or an alkyl group containing not more than 12 carbon atoms and

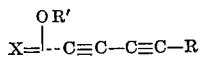

where R is an alkyl group containing up to 5 carbon atoms and R′ is H or R.

6. 17α-alka-1′,3′-diynyl steroids having the formula

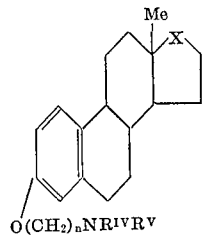

where $n$ is an integer between 2 and 6 and $R^{IV}$ and $R^V$ are alkyl groups containing up to 5 carbon atoms and

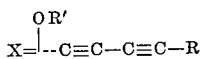

where R is an alkyl group containing up to 5 carbon atoms and R′ is H or R.

7. 17α-alka-1′,3′-diynyl steroids having the formula

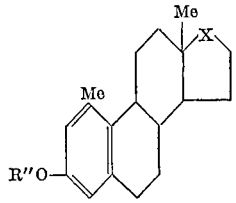

where R″=H or an alkyl group containing not more than 12 carbon atoms and

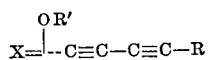

where R is an alkyl group containing up to 5 carbon atoms and R′ is H or R.

8. 17α-alka-1′,3′-diynyl steroids having the formula

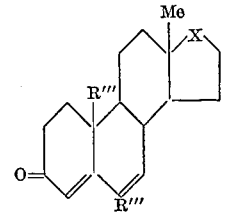

where R‴ is H or Me and

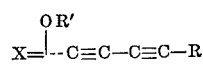

where R is an alkyl group containing up to 5 carbon atoms and R′ is H or R.

9. 17α-alka-1′,3′-diynyl steroids having the formula

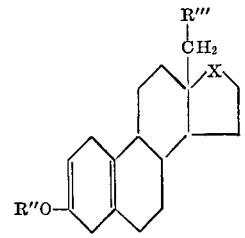

where R″=an alkyl group containing not more than 5 carbon atoms where R‴=Me or Et and

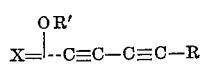

where R is an alkyl group containing up to 5 carbon atoms and R′ is H or R.

10. 17α - (penta - 1′,3′ - diynyl) - 19 - norandrost - 4-en-17β-ol-3-one.

11. 17α - (hexa - 1′,3′ - diynyl) - 3 - methoxy - oestra-1,3,5(10)-trien-17β-ol.

12. 17α - (hexa - 1′,3′ - diynyl) - 3,17β - dimethoxy-oestra-1,3,5(10)-triene.

13. 17α-(hexa-1′,3′-diynyl)-5α-androst-2-en-17β-ol.

14. (dl) - 17α - (hexa - 1′,3′ - diynyl) - 3 - methoxy-18-methyl-8α-oestra-1,3,5(10)-trien-17β-ol.

15. 17α - (hexa - 1′,3′ - diynyl) - oestra - 1,3,5(10)-triene-3,17β-diol.

16. 17α - (hexa - 1′,3′ - diynyl) - oestra - 1,3,5(10)-trien-17β-ol.

17. (dl) - 17α - (hexa - 1′,3′ - diynyl) - 17β - hydroxy-18-methyl-19-norandrost-4-en-3-one.

18. 17α - (hexa - 1′,3′ - diynyl) - 17β - hydroxy - 19-norandrost-4-en-3-one.

19. 17α - (n - hepta - 1′,3′ - diynyl) - 3 - methoxy-oestra-1,3,5(10)-trien-17β-ol.

20. 17α - (hepta - 1′,3′-diynyl) - 17β - hydroxy - 19-norandrost-4-en-3-one.

21. 17α - (hexa - 1′,3′ - diynyl) - 4 - methyl -oestra-1,3,5(10)-trien-17β-ol.

22. 17α - (hexa - 1′,3′ - diynyl) - 17β - hydroxy - 6α-methyl-19-norandrost-4-en-3-one.

References Cited
UNITED STATES PATENTS
2,877,240   3/1959   Campbell et al. ------ 260—397.4
3,164,617   1/1965   Feather et al. ------ 260—397.4

HENRY A. FRENCH, *Primary Examiner.*

U.S. Cl. X.R.

260—397.5, 397.45, 999